(12) United States Patent
Yoshida et al.

(10) Patent No.: US 6,903,948 B2
(45) Date of Patent: Jun. 7, 2005

(54) POWER CONVERTER EMPLOYING PULSE WIDTH MODULATION CONTROL

(75) Inventors: Masahiko Yoshida, Tokyo (JP); Masahiro Kimata, Tokyo (JP); Yasushi Ikawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/470,484

(22) PCT Filed: Jul. 18, 2002

(86) PCT No.: PCT/JP02/07316

§ 371 (c)(1),
(2), (4) Date: Jul. 30, 2003

(87) PCT Pub. No.: WO2004/010570

PCT Pub. Date: Jan. 29, 2004

(65) Prior Publication Data

US 2004/0232897 A1 Nov. 25, 2004

(51) Int. Cl.[7] ............................................... H02M 7/68
(52) U.S. Cl. ........................................... 363/95; 363/41
(58) Field of Search ............................. 363/37, 41, 44, 363/77–79, 89, 97, 98, 125, 131, 132, 95

(56) References Cited

U.S. PATENT DOCUMENTS 4,689,543 A * 8/1987 Hucker ........................ 318/798

4,891,744 A * 1/1990 Yamamoto et al. ........... 363/89

FOREIGN PATENT DOCUMENTS

| JP | 9-154283 A | 6/1997 |
| JP | 10-42569 A | 2/1998 |

* cited by examiner

Primary Examiner—Michael Sherry
Assistant Examiner—Gary L. Laxton
(74) Attorney, Agent, or Firm—Sughrue Mion, PLLC

(57) ABSTRACT

A power converter includes a first sampling device 5 which samples a first command current value for a power conversion device 2 during a second cycle and produces a second command current value; a second sampling device 6 which samples a first detected current value pertaining to a load 3 and produces a second detected current value; a command voltage value calculator 9 for calculating a command voltage value from the second command current value and the second detected current value; a comparator 11 for comparing the second command voltage value with a triangular wave carrier signal, to thereby produce a first pulse width modulation (PWM) signal; and a multi-pulse prevention device 12. The multi-pulse prevention device 12 has inversion detection device for detecting inversion of the first PWM signal, and inversion inhibition device for driving the power conversion device 2 through use of a second PWM signal which prevents inversion of the first PWM signal, on the basis of a result of detecting operation performed by the inversion detection device.

12 Claims, 19 Drawing Sheets

FIG. 8
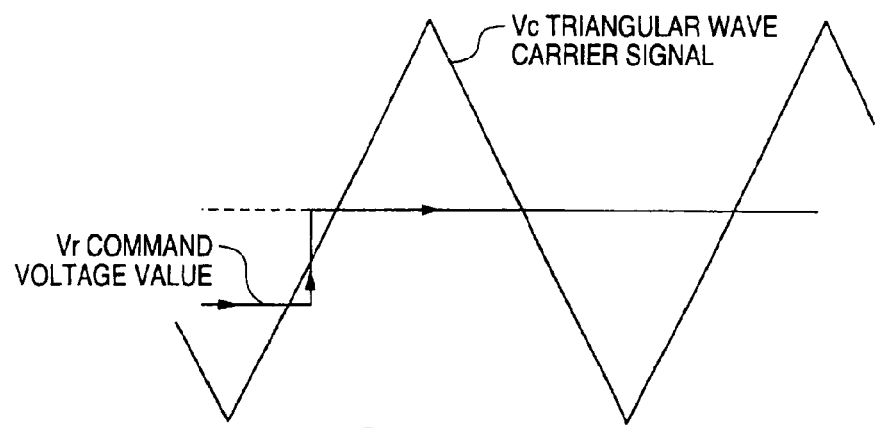
FIG. 8A
FIRST PWM SIGNAL P_in
FIG. 8B
SECOND PWM SIGNAL P_out
FIG. 8C
$\Delta P = P\_in - P\_out$
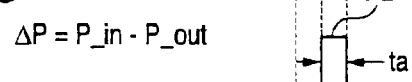
FIG. 8D
SUM OF ERRORS $\Delta P$
FIG. 8E
THIRD PWM SIGNAL P3
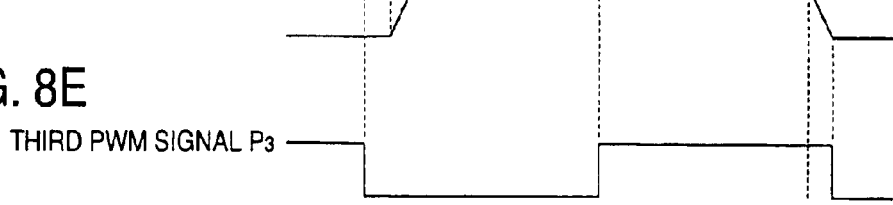

FIRST PWM SIGNAL P_in

SECOND PWM SIGNAL P_out

ΔP = P_in - P_out

SUM OF ERRORS ΔP

THIRD PWM SIGNAL P3

POWER CONVERTER EMPLOYING PULSE WIDTH MODULATION CONTROL

FIELD OF THE INVENTION

The invention relates to a power converter employing pulse width modulation (PWM) control, and more particularly, to a controller which detects a current value of a load to be driven by the power converter and, through feedback control, causes the current value to follow a command current value.

BACKGROUND OF THE INVENTION

A related-art power converter to be driven through PWM control computes a command voltage value from a command current value for a load and a detected current value, compares the command voltage value with a triangular wave carrier signal, and drives the power converter by producing a PWM pulse signal, thereby controlling the load. In this case, there is adopted a sample-and-hold method for simultaneously sampling the command value and the detected value and reading the thus-sampled values.

However, pulsating components (current ripples) present in a detected current value. For this reason, a power converter less susceptible to the influence of pulsating components is proposed in JP-A-9-154283.

In order to eliminate the pulsating components, the thus-proposed power converter is provided with a sampled value compensator for averaging an output from a sample-and-hold device for sampling a command value, thus eliminating a pulsating component.

However, such a power converter has a sampled-value compensator for eliminating pulsating components included in a detected current value. An average current value obtained by way of the sampled value compensator is to be controlled by the power converter. Even when an abrupt change has arisen in the detected current value, the sampled value compensator averages the change, thus impeding achievement of a sufficient high-speed response.

When an average produced by the sampled compensator is relaxed in order to achieve a high-speed response, current ripples stemming from PWM control is superimposed on a detected current value. In such a case, no current ripples are included in the command current value, and hence a voltage command value calculator produces a voltage to be used for reducing current ripples. As a result, variations in the command voltage value become greater. FIG. 19 shows that state, wherein a command voltage value varies greatly, and a triangular wave carrier signal and the command voltage value cross each other a plurality of times during a half cycle of a triangular wave carrier signal. Therefore, the number of pulses of the PWM signal output from a comparator increases in areas enclosed by circles in the drawing. The PWM signal is for driving a power switching element provided in the power converter. When an increase in the number of pulses arises, the number of times the power switching element is switched is also increased, thus increasing a switching loss. For this reason, there arises a problem of a necessity for adopting a power switching element having a large rated capacity.

BRIEF SUMMARY OF THE INVENTION

The invention is conceived to solve the foregoing problems and is aimed at providing a power converter which provides a high-speed current response without involvement of an increase in the number of pulses of a pulse width modulation (PWM) signal; i.e., occurrence of multiple pulses.

A power converter according to a first invention comprises:

triangular wave carrier signal generation device for generating a triangular wave carrier signal during a first cycle;

first sampling device for sampling a first command current value for a power conversion device during a second cycle which is set so as to become shorter than one-half the first cycle and for generating a second command current value;

second sampling device for sampling, during the second cycle, a first detected current value for a load to be driven by the power conversion device and producing a second detected current value;

command voltage value calculation device for calculating a command voltage value on the basis of the second command current value and the second detected current value;

comparison device for producing a first pulse width modulation (PWM) signal by comparing the second command voltage value with the triangular wave carrier signal;

inversion detection device for detecting inversion of the first PWM signal; and inversion inhibition device for driving the power conversion device by means of a second PWM signal which prevents inversion of the first PWM signal during the first cycle, on the basis of a result of detection of the inversion detection device.

By means of such a power converter, in a state in which the sampling cycle of the first and second sampling device is set to a second cycle shorter than a half cycle of the triangular wave carrier signal, the inversion detection device detects inversion of the first PWM signal. The inversion inhibition device produces a second PWM signal which prevents inversion of the first PWM signal during a half cycle of the triangular wave carrier signal, on the basis of a result of detecting operation performed by the inversion detection device. The power conversion device is driven through use of the second PWM signal. Therefore, the power conversion device 2 is driven through use of the second PWM signal which prevents occurrence of multiple pulses while a high-speed current response is realized. Hence, there is yielded an advantage of the ability to inhibit occurrence of a switching loss of the power conversion device.

A power converter according to a second invention comprises:

triangular wave carrier signal generation device for generating a triangular wave carrier signal during a first cycle;

first sampling device for sampling a first command current value for a power conversion device during a second cycle which is set so as to become shorter than one-half the first cycle and for generating a second command current value;

intersection detection device for sampling a first detected current of a load to be driven by the power conversion device during the second cycle and detecting occurrence of an intersection between the first command voltage value and the triangular wave carrier signal;

command voltage value suppression device for producing a second command voltage value which prevents occurrence of a change in the first command voltage value, so as to prevent re-occurrence of an intersection between the first command voltage value and the triangular wave carrier signal within the first cycle, on the basis of a result of detection performed by the intersection detection device; and comparison device for comparing the second command voltage value with the triangular wave carrier signal, thereby producing a PWM signal and driving the power conversion device through use of the PWM signal.

By means of such a power converter, in a state in which the sampling cycle of the first and second sampling device is set to a second cycle shorter than a half cycle of the triangular wave carrier signal, the intersection detection device detects occurrence of an intersection between the command voltage value and the triangular wave carrier signal. The command voltage suppression device produces a second command voltage value for suppressing occurrence of a change in the first command voltage value such that the command voltage value and the triangular wave carrier signal do not again cross each other within a half cycle of the triangular wave carrier signal. Therefore, occurrence of an intersection between the second command voltage value and the triangular wave carrier signal is inhibited, thereby preventing inversion of the first PWM signal. Consequently, the power conversion device is driven by means of the first PWM signal which prevents occurrence of multiple pulses while a high-speed current response is realized. Therefore, there is yielded an advantage of the ability to suppress a switching loss.

A feature of a power converter according to a third invention lies in error compensation device which determines a difference between a pulse width of the first PWM signal and that of the second PWM signal, produces a third PWM signal by adding the difference to the pulse width of the second PWM signal which is to be produced in the next half cycle or a subsequent half cycle of the triangular wave carrier signal, and drives the power conversion device by means of the third PWM signal in place of the second PWM signal.

By means of such a power converter, the pulse width calculation device determines, as a difference pulse width, a difference between the pulse width of the first PWM signal and that of the second PWM signal. The third PWM signal—which is formed by addition of the difference pulse width to a second PWM signal to be produced during the first half cycle or a subsequent half cycle—is used for driving the power conversion device. Therefore, a switching loss of the power conversion device can be suppressed by inhibiting inversion of the second PWM signal while a high-speed current response is achieved. Further, the first and third PWM signals are equal to each other in terms of total pulse width, and hence there is yielded an advantage of the ability to realize operation of the power conversion device faithful to the command voltage value.

A power converter according to a fourth invention is characterized by comprising:

command voltage difference calculation device for determining a difference command voltage value which represents a difference between the first command voltage value and the second command voltage value during a first half cycle of the triangular wave carrier signal;

command voltage correction device for adding a third command voltage value, to which is added the difference command voltage value, to the second command voltage value produced during the first half cycle or a subsequent half cycle; and comparison device which compares the third command voltage value, in lieu of the second command voltage value, with the triangular wave carrier signal, to thereby produce the PWM signal, and which drives the power conversion device through use of the PWM signal.

Therefore, there is yielded an advantage of the ability to inhibit occurrence of an intersection between the command voltage value and the triangular wave carrier signal while a high-speed current response is implemented. As a result of inversion of the first PWM signal being inhibited, a switching loss of the power conversion device can be suppressed. Moreover, there is yielded an advantage of the ability to realize operation of the power conversion device faithful to the first command voltage value serving as an original command voltage.

A power converter according to a fifth invention is characterized by comprising:

first changeover device which switches the second or third PWM signal to the first PWM signal by means of a changeover command signal, to thereby drive the power conversion device.

For instance, such a power converter yields an advantage of the ability to realize a high-speed response to a command by means of the first changeover device selecting the first PWM signal when a margin is provided for a switching loss of the power conversion device and also an advantage of the ability to inhibit occurrence of the switching loss by means of the first changeover device selecting the second PWM signal when no margin is provided for the switching loss.

A power converter according to a sixth invention is characterized by comprising:

second changeover device which switches the second or third command voltage value to the first command voltage value by means of a changeover command signal.

For instance, such a power converter yields an advantage of the ability to realize a high-speed response to a command by means of the second changeover device selecting the first command voltage value when a margin is provided for a switching loss of the power conversion device. Conversely, the power converter also yields an advantage of the ability to inhibit occurrence of the switching loss by means of the second changeover device selecting the second command voltage value when no margin is provided for the switching loss.

A power converter according to a seventh invention is characterized by comprising:

current comparison device which compares a difference between the second command current value and the second detected current value with a predetermined reference current value and produces the changeover command signal when the difference exceeds the reference current value.

Such a power converter yields an advantage of the ability to realize a high-speed response by selecting the first command voltage or the first PWM signal through use of the changeover command signal when the difference exceeds the reference current value. Conversely, the power converter also yields an advantage of the ability to inhibit occurrence of a switching loss by means of the first or second changeover device selecting the second command voltage or the second PWM signal when the current difference is smaller than the reference current value.

A power converter according to an eighth invention is characterized by comprising:

count detection device which counts the number of switching operations of the power conversion device within a predetermined period of time and outputs a detected count value; and count comparison device which compares a predetermined reference count value with the detected count value and produces the changeover command signal when the detected count value is lower than the reference count value.

Such a power converter yields an advantage of the ability to realize a high-speed response by means of the count comparison device selecting the first PWM signal or the first command voltage value when the detected count value is lower than the reference count value. Conversely, the power converter also yields an advantage of the ability to inhibit occurrence of a switching loss by means of the count comparison device selecting the second command voltage value or the second PWM signal when the detected count value exceeds the reference count value.

A power converter according to a ninth invention is characterized by comprising:

temperature detecting device for detecting a temperature of the power conversion device; and temperature comparison device which compares a predetermined reference temperature with the detected temperature and which produces the changeover command signal when the detected temperature is lower than the reference temperature.

Such a power converter yields an advantage of the ability to realize a high-speed response by means of the temperature comparison device selecting the first PWM signal or the first command voltage value when the detected temperature is lower than the reference temperature. Conversely, the power converter also yields an advantage of the ability to inhibit occurrence of a switching loss by means of the temperature detection device selecting the second command voltage value or the second PWM signal when the detected temperature exceeds the reference temperature.

BRIEF DESCRIPTION OF THE DRAWINGS

FIG. 8 is a timing chart showing triangular carriers arising in the power converter shown in FIG. 7 and a multi-pulse prevention device of the embodiment;

DETAILED DESCRIPTION OF THE INVENTION

First Embodiment

A power converter according to a first embodiment of the invention will now be described by reference to a block diagram shown in FIG. 1.

Figure 1:
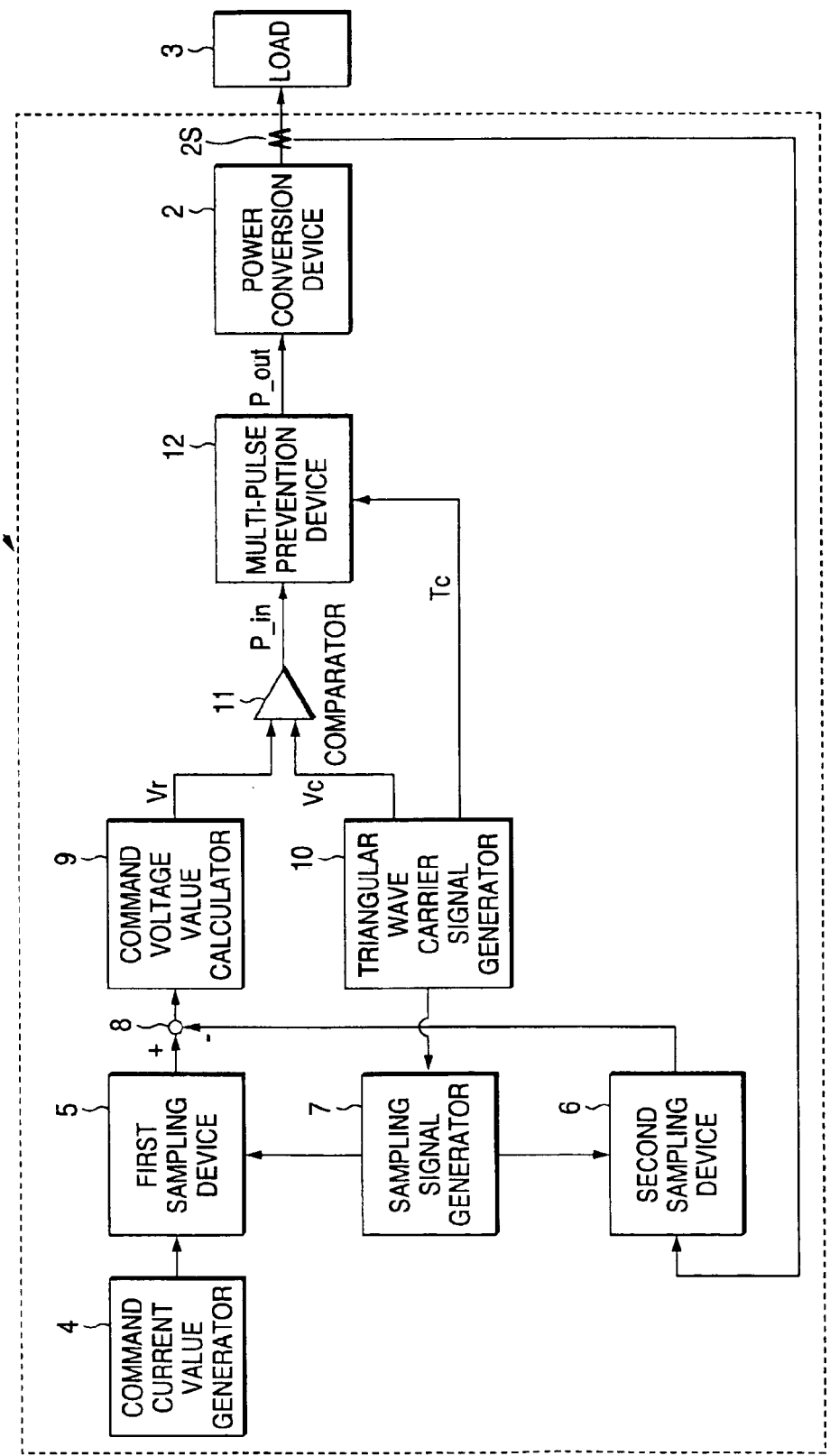
FIG. 1 is a block diagram showing a power converter according to an embodiment.

In FIG. 1, a power converter 1 comprises a power conversion device (power conversion device) 2 having a power switching element, such as a transistor; a command current value generator 4 serving as command current value generation device for generating a command current value for the power conversion device 2; a first sampling device (first sampling device) 5 which samples a first command current value for the power conversion device 2 and outputs a second command current value; a second sampling device (second sampling device) 6 which samples a first current value detected by a current detector 2s, the detector detecting a current flowing through a load 3, and outputs a second detected current value; a sampling signal generator 7 which determines sampling timings of the first and second sampling devices 5, 6 and produces a sampling signal having a second cycle, the cycle being shorter than one-half the cycle of a triangular wave carrier signal Vc to be described later, i.e., tc/2, in synchronism with the triangular wave carrier signal; a subtracter 8 which determines a difference between an output from the first sampling device 5 and an output from the second sampling device 6; that is, a difference between the second command current value and the second detected current value; a command voltage value calculator 9 for calculating a command voltage value of the power conversion device 2 in accordance with an output from the subtracter 8; a triangular wave carrier signal generator 10 which produces the triangular wave carrier signal Vc from the first cycle and a triangular synchronous signal Tc at each half cycle of the triangular wave carrier signal Vc, the synchronous signal being subjected to repetition of inversion from a rise to a fall, i.e., a rise in synchronism with a minimum amplitude value Vcmin of the triangular wave carrier signal Vc and a fall from a raised level in synchronism with a maximum amplitude value Vcmax of the triangular wave carrier signal Vc; a comparator (comparison device) 11 which produces a first PWM signal having a pulse, by comparing the command voltage value Vr with the triangular wave carrier signal Vc, the pulse being subjected to inversion from a rise to a fall; a multi-pulse prevention device 12 which receives the first PWM signal and outputs a second PWM signal; and a power converter 2 to be driven by the second PWM signal.

Reference numeral 3 designates a load to be driven by the power converter 2.

A change from a rise (fall) of a pulse of the first PWM signal to a fall (rise) is called an inversion. The multi-pulse prevention device 12 comprises inversion detection device for detecting inversion of the first PWM signal; and inversion inhibition device which produces the second PWM signal on the basis of a result of detection performed by the inversion detection device, the second PWM signal inhibiting inversion, i.e., re-inversion of the first PWM signal which would arise within a half cycle of the triangular wave carrier signal Vc, and which drives the power conversion device 2 through use of the second PWM signal.

The specific multi-pulse prevention device 12 comprises an exclusive OR element 13 which produces a signal Sa by calculating an exclusive OR result between an input signal Pin serving as the first PWM signal P_in (hereinafter often called a "First PWM signal P_in") and the triangular wave carrier signal Tc; an AND element 14 which produces a signal Sc by calculating an AND result from the signal Sa and a high-frequency clock signal CLK; and a latching element 15 formed from a D-type flip-flop which receives the signal Sc and produces an output signal Pout serving as the second PWM signal (hereinafter often called a "second PWM signal P_out").

Figure 2:
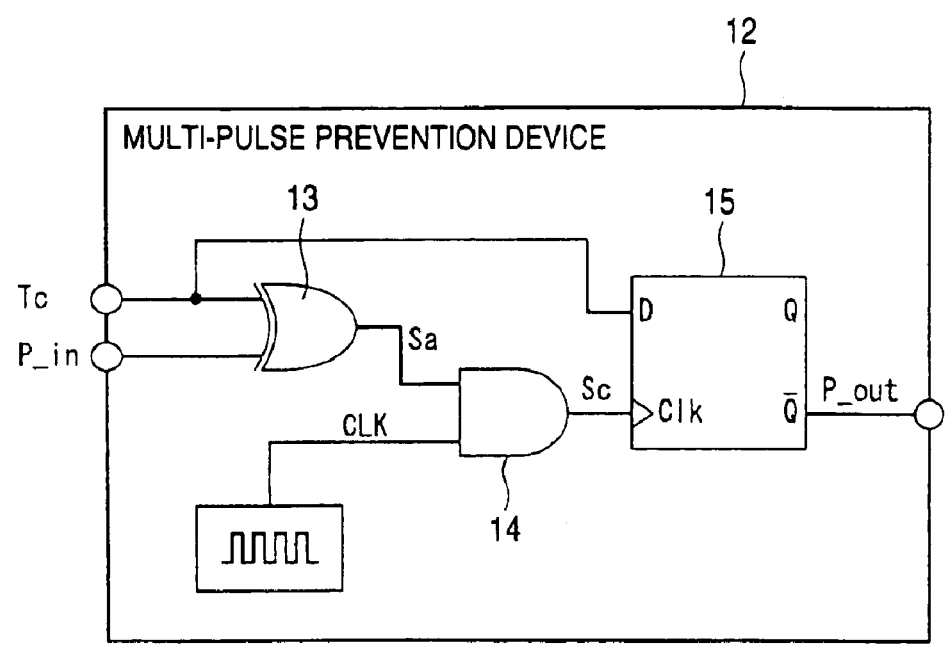
FIG. 2 is an internal schematic diagram of a multi-pulse prevention device of the embodiment.

Overall operation of the power converter having the foregoing configuration will now be described by reference to FIGS. 1 through 3. The first sampling device 5 samples the first command current value generated by the command current value generator 4, thereby outputting a second command current value. The second sampling device 6 samples a first detected current, which is produced as a result of a current flowing through the power conversion device 2 being detected by the current detector 2S, thereby outputting a second command current value Vr. The subtracter 8 calculates a deviation between the command current value and the detected current value and sends the deviation to the command voltage value calculator 9. The command voltage value calculator 9 calculates a command voltage value Vr for the voltage converter 2 so as to make the deviation small, thereby outputting the command voltage value. The comparator 11 compares the command voltage value Vr with the triangular wave carrier signal Vc, thereby producing the first PWM signal, which serves as a pulse train to be used for driving the voltage conversion device 2.

The multi-pulse prevention device 12 produces the second PWM signal P_out from the first PWM signal P_in and the triangular synchronous signal Tc and outputs the thus-produced second PWM signal P_out to the power conversion device 2, thereby activating the switching element of the power conversion device 2. As a result, a voltage is out, thereby driving the load 3.

The current flowing through the power conversion device 2 is sampled by the second sampling device 6. The command voltage value calculator 9 performs control operation so as to make the deviation between the command current value and the detected current value small. Hence, the power conversion device 2 is operated so as to follow the command current value.

Next, operation of the multi-pulse prevention device 12 will now be described with reference to FIGS. 1 through 3. First, the multi-pulse prevention device 12 detects and stores inversion of the first PWM signal P_in and outputs the second PWM signal P_out which prevents occurrence of re-inversion within a one-half cycle tc/2 of the triangular carrier Vc.

Figure 3:
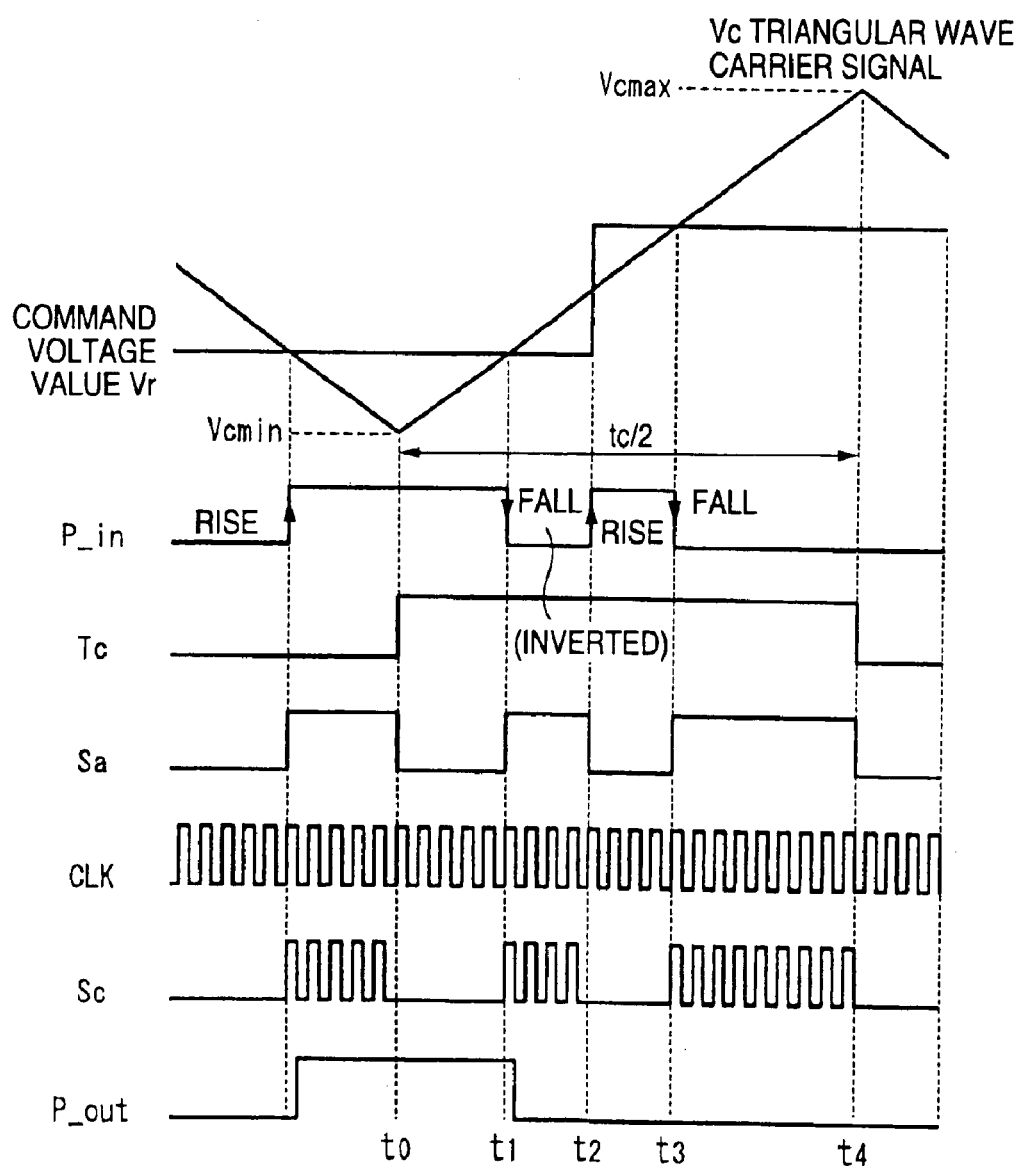
FIG. 3 is a timing chart showing triangular carriers arising in a multi-pulse prevention device of the embodiment.

More specifically, as shown in FIG. 3, the comparator 11 compares the command voltage value Vr with the triangular wave carrier signal Vc, thereby outputting the first PWM signal P_in. A pulse of the first PWM signal P_in rises at time t0 and is not inverted into a fall until time t1 in a half cycle tc/2 of the triangular carrier Vc. The pulse is again inverted into a rise at time t2, and further subjected to inversion into a fall at time t3.

The exclusive OR element 13 receives the triangular synchronous signal Tc and the first PWM signal P_in, thereby outputting the signal Sa. The AND element 14 receives the signal Sa and the clock signal CLK, to thereby output the signal Sc. The latching element 15 receives the signal Sc and the triangular wave synchronous signal Tc, thereby outputting the second PWM signal P_out as a latch output. The second PWM signal P_out rises substantially in synchronism with a rise in the first PWM signal. The latching element 15 detects first inversion of the first PWM signal at time t1 and stores the thus-detected inversion. Subsequently, no other inversion arises at any of times t1 through t4. Specifically, pulses have arisen in the first PWM signal P_in at times t2 to t3, whereas no pulses have arisen in the second PWM signal P_out at these times.

The power converter 1 prevents occurrence of multiple pulses in the second PWM signal to be used for driving the power conversion device 2. Hence, the number of switching operations of the power switching element constituting the power conversion device 2 is reduced, which in turn suppresses a rise in the temperature of the power switching element. Further, since a sampling signal whose cycle is shorter than a half cycle of the triangular carrier is used, a high-speed current response can be acquired.

Second Embodiment

Figure 4:
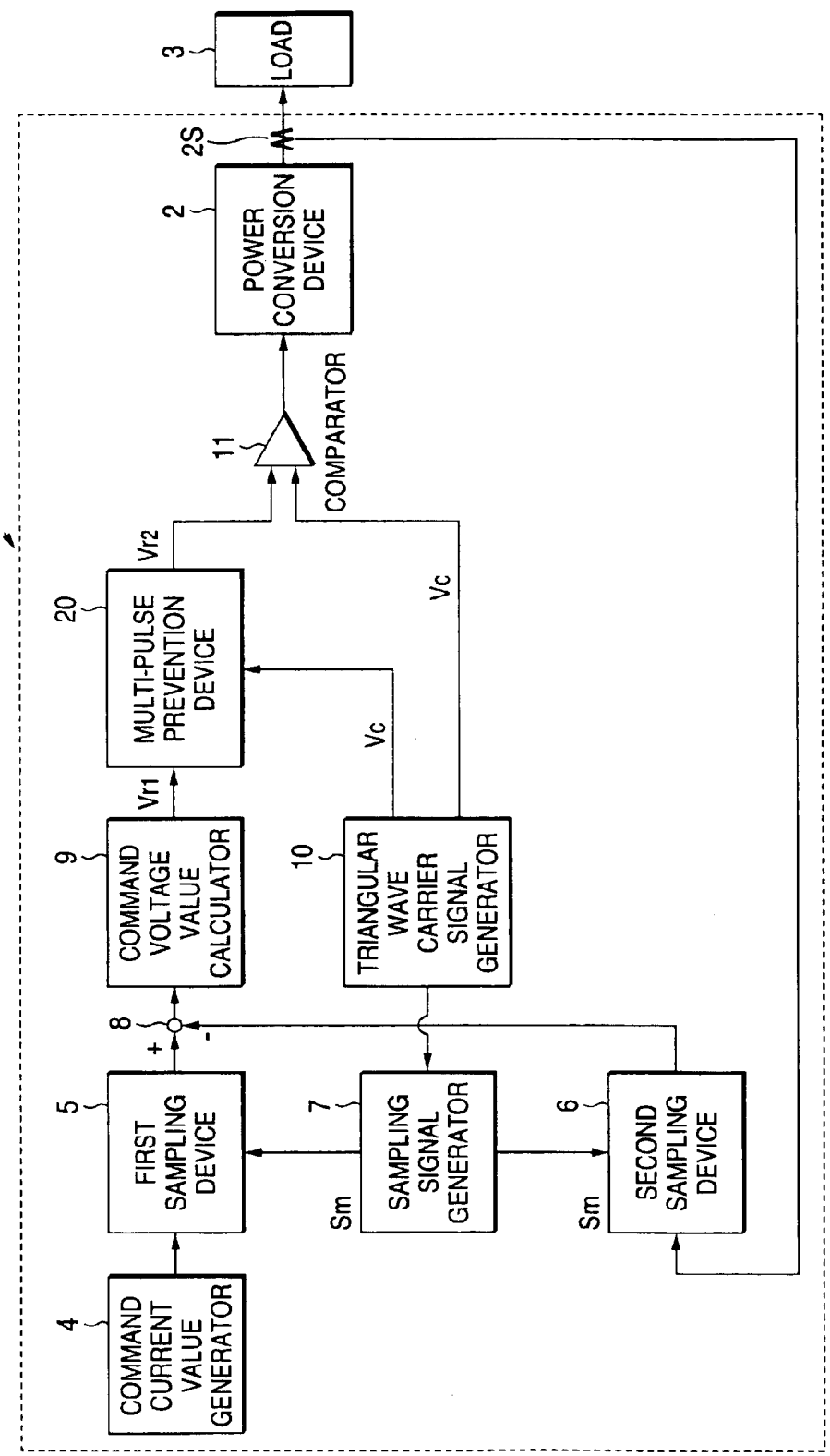
FIG. 4 is a block diagram of a power converter according to another embodiment of the invention.
Figure 5:
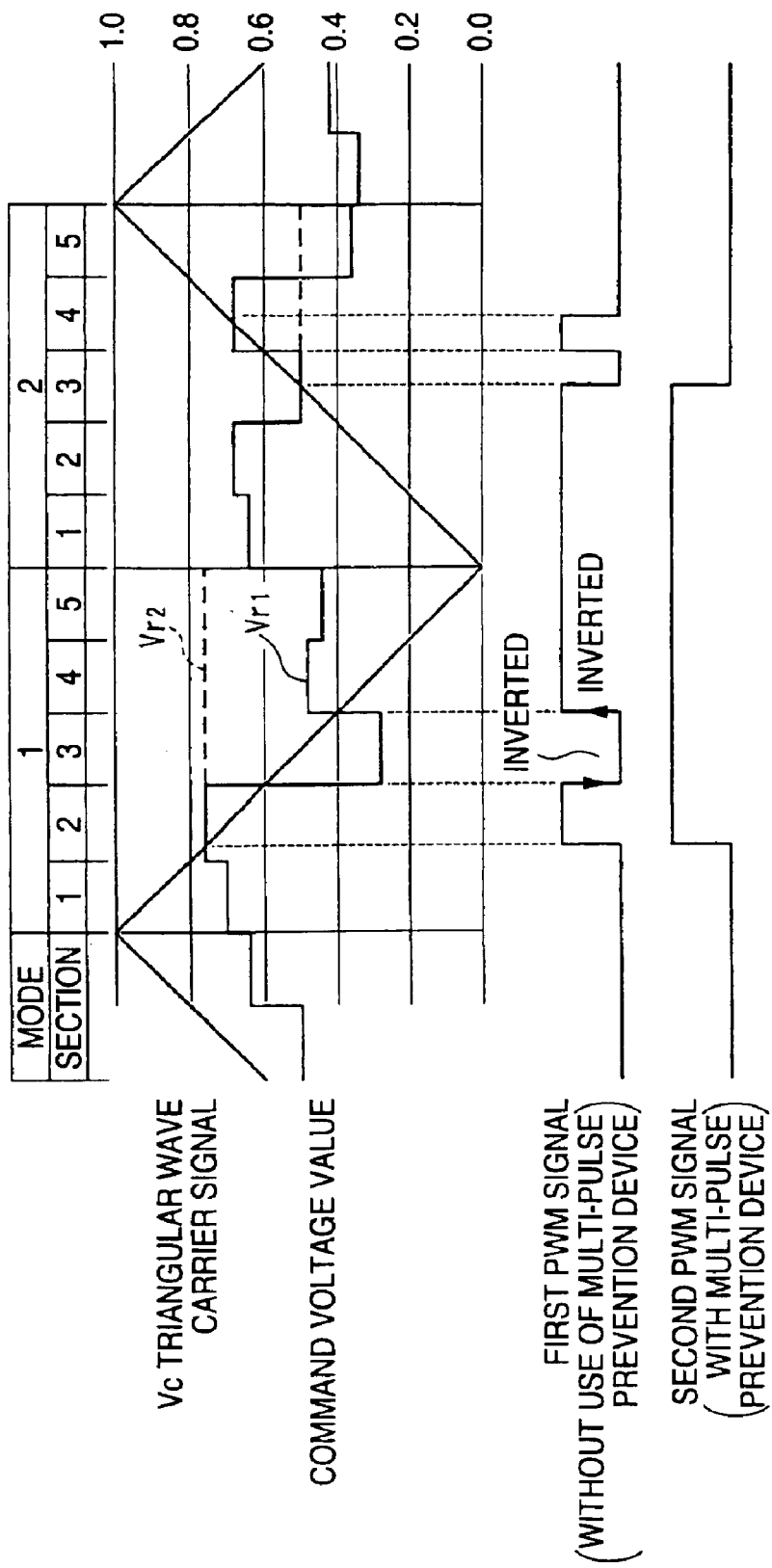
FIG. 5 is a timing chart of a multi-pulse prevention device employed in the power converter shown in FIG. 4.

A second embodiment of the invention will be described by reference to a block diagram of a power converter shown in FIG. 4. In FIG. 4, those reference numerals which are the same as those shown in FIG. 1 designate the same or corresponding elements, and hence repetition of their explanations is omitted.

A second multi-pulse prevention device 20 shown in FIG. 4 comprises intersection detection device for detecting occurrence of an intersection between the first command voltage value produced by the command voltage value computation device 9 and a triangular wave carrier signal; command voltage value suppression device for generating a second command voltage value which inhibits occurrence of a change in the first command voltage value so as not to again cause an intersection between the first command voltage value and the triangular wave carrier signal Vc within a first half cycle thereof, on the basis of a result of detection operation performed by the intersection detection device; and a comparator 11 which compares the second command voltage value with the triangular wave carrier signal Vc, thereby producing the first PWM signal and driving the power conversion device 2 through use of the first PWM signal.

<Description of Basic Operation>

Basic operation of the multi-pulse prevention device 20 will now be described with reference to FIG. 4. As shown in FIG. 4, the cycle of a sampling signal produced by the sampling signal generator 7 is one-fifth of a half cycle of the triangular wave carrier signal Vc.

A sampling signal arises at the head of Sections 1 through 5. A period of time during which the triangular wave carrier signal Vc decreases is taken as mode 1, and a period of time during which the triangular wave carrier signal Vc increases is taken as mode 2. The sampling signal generator 7 is presumed to supply a single sampling signal Sm to the first and second sampling devices 5, 6. The command voltage value calculator 9 is presumed to output a first command voltage value without a delay time, which would otherwise be caused by computation, by means of sampling a command current value and a detected current value. In this situation, the first command voltage value is updated at the head of each Section.

In a case where the multi-pulse prevention device 20 is not provided; that is, where an output from the command voltage value calculator 9 is connected directly to the comparator 11, when the first command voltage value Vr1 has shifted from a level lower than the triangular carrier wave Vc to a level higher than the same in Mode 1, the comparator 11 detects occurrence of an intersection between the first command voltage value Vr1 and the triangular carrier Vc, thereby outputting an original PWM signal after having inverted it.

In Mode 2, when the first command voltage value Vr1 has shifted from the level higher than the triangular wave carrier signal to a level lower than the same, the comparator 11 detects occurrence of an intersection between the first command voltage value Vr1 and the triangular wave carrier signal Vc, thereby inverting the original PWM signal.

In view of the foregoing description, a determination as to whether or not the original PWM signal is to be inverted is made by means of examining the magnitude of the first command voltage value Vr1 in each section and determining whether or not an intersection arises between the triangular wave carrier signal Vc and the first command voltage value Vr1.

For brevity, we assume that the voltage value of the triangular wave carrier signal Vc changes linearly over the range from 0.0 to 1.0. When the voltage value of the triangular wave carrier signal Vc is decreased as in the case of mode 1, the triangular wave signal Vc assumes voltage values of 1.0, 0.8, 0.6, 0.4, 0.2, and 0.0 at respective boundaries between the sections. In contrast, when the voltage value of the triangular wave carrier signal Vc is increased as in the case of mode 2, the triangular wave carrier signal Vc assumes voltage values of 0.0, 0.2, 0.4, 0.6, 0.8, and 1.0 at respective boundaries between the sections.

At section 1 of Mode 1, the first command voltage value Vr1 assumes a value of 0.7, and this value is smaller than a boundary value of 0.8 which arises between sections 1 and 2 of Mode 1 and serves as the voltage value of the triangular wave carrier signal Vc. Hence, no intersection arises between the first command voltage value Vr1 and the triangular wave carrier signal Vc.

At section 2 of Mode 1, the first command voltage value is 0.78, and this value is higher than a boundary value of 0.6 which arises between sections 2 and 3 of Mode 1 and serves as the voltage value of the triangular wave carrier signal Vc. Hence, an intersection arises between the first command voltage value Vr1 and the triangular wave carrier signal Vc. Consequently, the original PWM signal is subjected to inversion at section 2 of Mode 1 within a half cycle of the triangular wave carrier signal Vc.

In Mode 1, after the first command voltage value Vr1 and the triangular wave carrier signal Vc have crossed each other, the first command voltage value Vr1 again shifts from a level lower than the triangular wave carrier signal Vc to a level higher than the same, whereby the first command voltage value Vr1 and the triangular waveform carrier signal Vc again cross each other, as a result of which the original PWM signal is inverted at the rear boundary of section 3.

In Mode 2, the first command voltage value Vr1 again shifts from a level lower than the triangular wave carrier signal Vc to a level higher than the same, whereupon the first command voltage signal Vr1 and the triangular wave carrier signal Vc again cross each other.

Consequently, when the first command voltage value Vr1 has become greater than the triangular wave carrier signal Vc in Mode 1, there is produced a second command voltage value Vr2 which makes the first command voltage value Vr1 constant by means of suppressing occurrence of variations in the first command voltage value Vr1 and which remains unchanged until the carrier enters the next mode. The second command voltage value Vr2 is produced so as not to shift to a state in which the second command voltage value Vr2 becomes smaller than the triangular wave carrier signal Vc.

When the first command voltage value Vr1 has become smaller than the triangular wave carrier signal Vc in Mode 2, there is produced the second command voltage value Vr2 which makes the first command voltage value Vr1 constant by means of suppressing occurrence of variations in the first command voltage value Vr1 and which remains unchanged until the carrier enters the next mode. The second command voltage value Vr2 is produced so as not to shift to a state in which the second command voltage value Vr2 becomes smaller than the triangular wave carrier signal Vc.

Consequently, the second command voltage value Vr2 can be prevented from again crossing the triangular wave carrier signal Vc, thereby preventing occurrence of multiple pulses, as is the case with the first PWM signal output from the comparator 11.

<Description of Operation of the Multi-Pulse Prevention Device According to the Flowchart>

Figure 6:
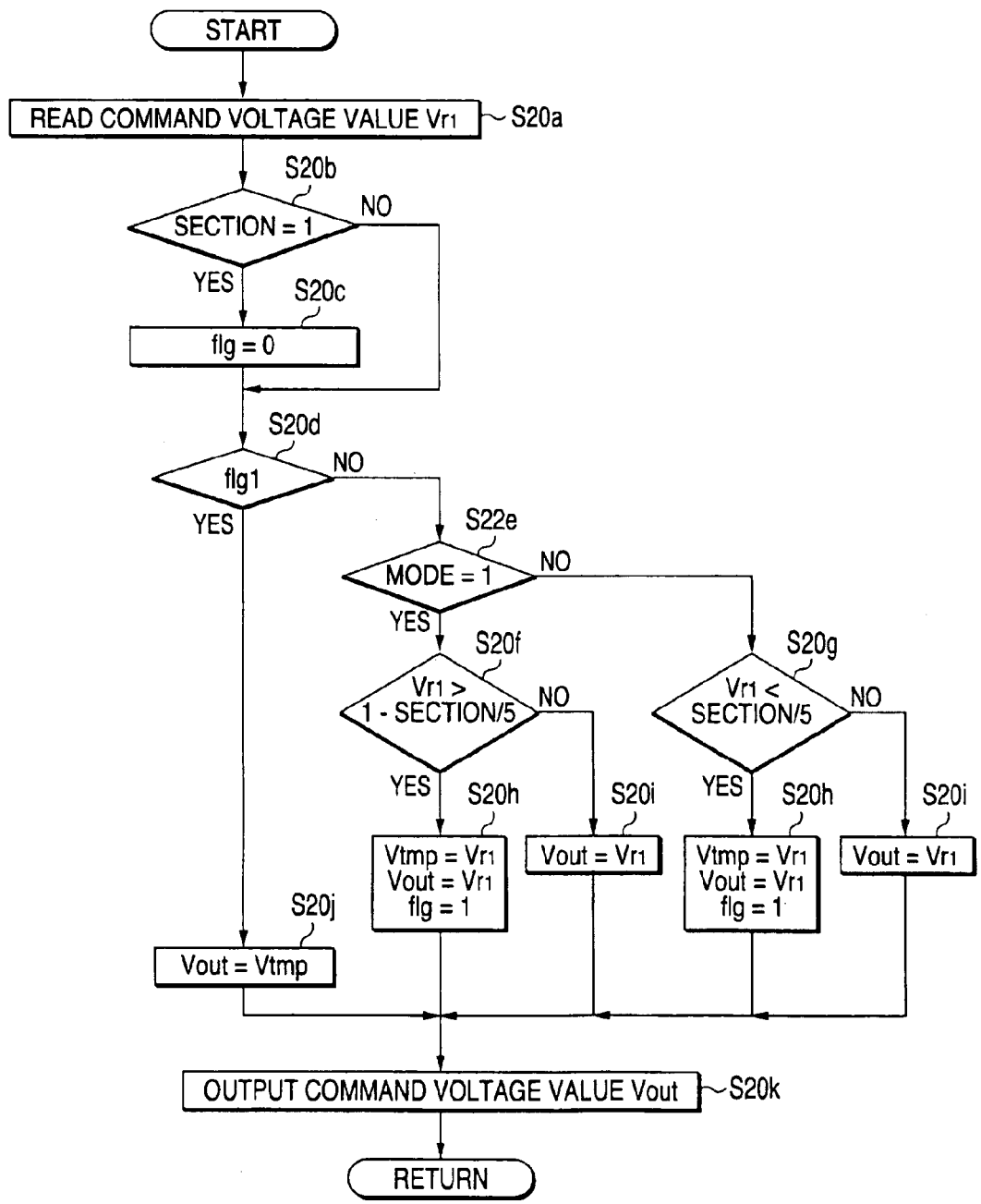
FIG. 6 is a flowchart of the multi-pulse prevention device shown in FIG. 5.

Operation of the multi-pulse prevention device 20 having the foregoing construction will now be described by reference to a flowchart shown in FIG. 6. The multi-pulse prevention device 20 reads the first command voltage value Vr1 (step S20a), and a determination is made as to whether or not the triangular wave carrier signal Vc has shifted to a new half cycle (step S20b). When the triangular wave carrier signal Vc has shifted to the half cycle, a flag fig to be used for detecting and storing an intersection between the first command voltage Vr1 and the triangular wave carrier signal Vc is cleared (step S20c).

The multi-pulse prevention device 20 evaluates the flag flg (step S20d). When an intersection has not yet arisen between the first command voltage value Vr1 and the triangular wave carrier signal Vc until a preceding section, the multi-pulse prevention device 20 determines occurrence of an intersection between the first command voltage value Vr1 obtained in step S20e or subsequent steps and the triangular wave carrier signal Vc. First, a determination is made as to whether the current mode is Mode 1 or Mode 2 (step S20e), because boundary values existing between the sections in Mode 1 in which the triangular wave carrier signal Vc is decreased differ from those existing between the sections in Mode 2 in which the triangular wave carrier signal Vc is increased.

Next, a determination is made as to whether or not the first command voltage value Vr1 and the triangular wave carrier signal Vc cross each other, by inverting an output from the comparator 11 (step S20f or S20g). If in step S20f or S20g the intersection is determined to have arisen, the current first command voltage value Vr1 is stored as Vtmp, and the flat flg is set (step 20h). The current command voltage value Vr1 is output as an output Vout.

If in step S20f or S20g an intersection is determined not to have arisen, the current first command voltage value Vr1 is output as the output Vout (step S20i). When the first command voltage value Vr1 and the triangular wave carrier signal Vc are determined to have crossed each other before a preceding section as a result of determination of the flag flg being performed in step. S20d, the command voltage value Vtmp stored when the intersection has arisen between the current first command value Vr1 and the triangular wave carrier signal Vc is output as the output Vout (step S20j). When processing has reached step S20k by way of any path in the flowchart, the second multi-pulse prevention device 20 outputs the second command voltage value Vr2 as the output Vout (step S20k).

As mentioned above, the power converter 1 of the embodiment can sample the first command current value and the first detected current value through use of the sampling signal whose cycle is shorter than the half cycle of the triangular wave carrier signal Vc. Hence, the second multi-pulse prevention device 20 can more reliably prevent occurrence of multiple pulses in the PWM signal to be used for driving the power conversion device 2, while ensuring a high-speed current response.

In the descriptions, the time required for the command voltage value calculator 9 to perform calculation is set to zero. However, when the time is not set to zero, displacement arises in sections or modes by only an amount corresponding to a calculation time. An advantage similar to that obtained when the calculation time is set to zero can be yielded, so long as an intersection between the command voltage value Vr and the triangular wave carrier signal Vc is determined at a section and mode in which a calculation result is output.

The descriptions have explained the embodiment in which the half cycle of the triangular wave carrier signal Vc is five times the cycle of the sampling signal. However, a similar advantage can be achieved even when the half cycle of the triangular wave carrier signal Vc is set to an arbitrary integral multiple of the cycle of the sampling signal.

Third Embodiment

Figure 7:
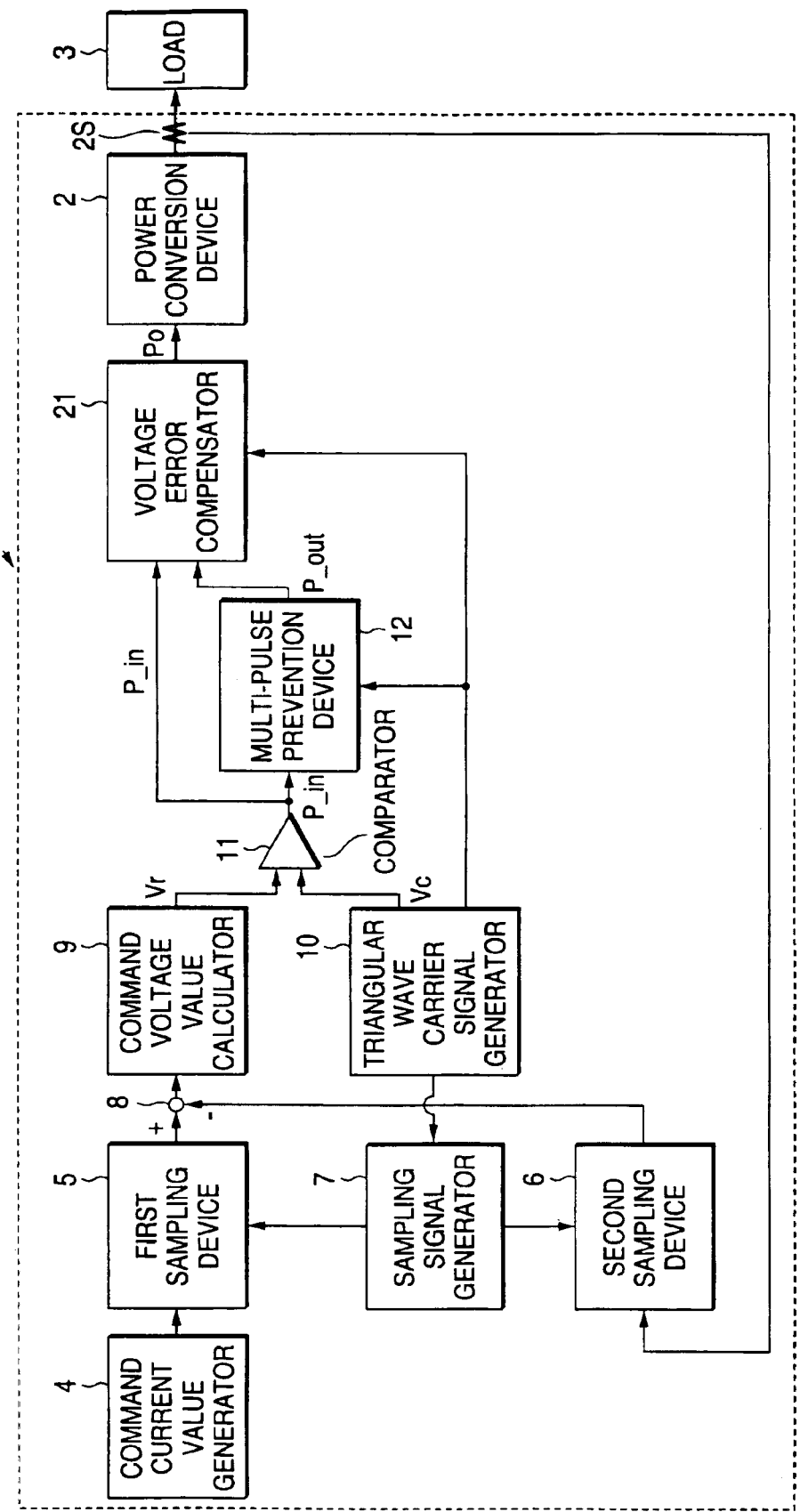
FIG. 7 is a block diagram of a power converter according to another embodiment of the invention.

The invention will now be described by reference to FIG. 7 which provides a block diagram of a power converter according to a third embodiment. In FIG. 7, those reference numerals which are the same as those shown in FIG. 1 designate the same or corresponding elements.

In the first embodiment, the power conversion device 2 is activated through use of the second PWM signal, which inhibits inversion of the first PWM signal produced as a result of comparison between the command voltage value Vr and the triangular wave carrier signal Vc. As a result, the second PWM signal is displaced from a command pertaining to the command voltage value Vr by only an amount corresponding to an extent to which occurrence of multiple pulses in the first PWM signal is inhibited.

In the present embodiment, the power conversion device 2 is activated so as to faithfully follow the command voltage value Vr while occurrence of multiple pulses is inhibited.

As shown in FIGS. 7 to 8E, a voltage error compensator 21 determines a difference ΔP(t) between the first PWM signal which is to serve as the output signal P_in from the comparator 11 and the second PWM signal which is to serve as the output signal P_out from the multi-pulse prevention device 12. Further, there is output a third PWM signal P0 corresponding to a result formed by addition of the difference ΔP(t) to the pulse width of the second PWM signal produced in the next half cycle or the subsequent cycle of the triangular wave carrier signal Vc. Thereby, the power conversion device 2 is driven.

<Description of the Basic Operation of the Power Converter>

Operation of the voltage error compensator 21 in the power converter having the foregoing construction will now be described by reference to FIGS. 7 to 8E.

When an intersection between the command voltage value Vr and the triangular wave carrier signal Vc arises twice as a result of the command voltage value Vr having risen, multiple pulses; that is, a pulse Pa, arise in an output from the comparator 11 (FIG. 8A). The multiple-pulse prevention device 12 outputs a pulse which is to become the second PWM signal, in order to inhibit occurrence of a change in the first PWM signal that has been inverted (FIG. 8B). A difference between the pulse width of the first PWM signal and that of the second PWM signal is ΔP(t). Specifically, the difference becomes a pulse width ta into which the first PWM signal has been changed by the multi-pulse prevention device 12 (FIG. 8C).

A total error is obtained by summation of the difference ΔP(t) (FIG. 8D). For example, the total error can be obtained by counting up, e.g., a high-frequency clock signal only over a period of time during which the pulse Pa arises, through use of a counter.

The count value is counted down when the output from the comparator 11 changes after one cycle of the triangular wave carrier signal Vc. If occurrence of a change in the output from the comparator 11 is inhibited until the count value returns to zero, the width of a pulse arising after lapse of one cycle can be increased by only an amount corresponding to the width of the pulse changed by the multi-pulse prevention device 12. The operations correspond to the operations of the voltage error compensator 21, and an output from the voltage error compensator is illustrated (FIG. 8E). By means of comparison between the first and third PWM signals, the width of the pulse that has arisen after lapse of one cycle is increased by only an amount corresponding to the width of the pulse changed by the multi-pulse prevention device 12. The total of the pulse width; that is, the average of the voltage output from the power conversion device 2, is maintained.

<Description of the Operation by Reference to Flowchart>

Figure 9:
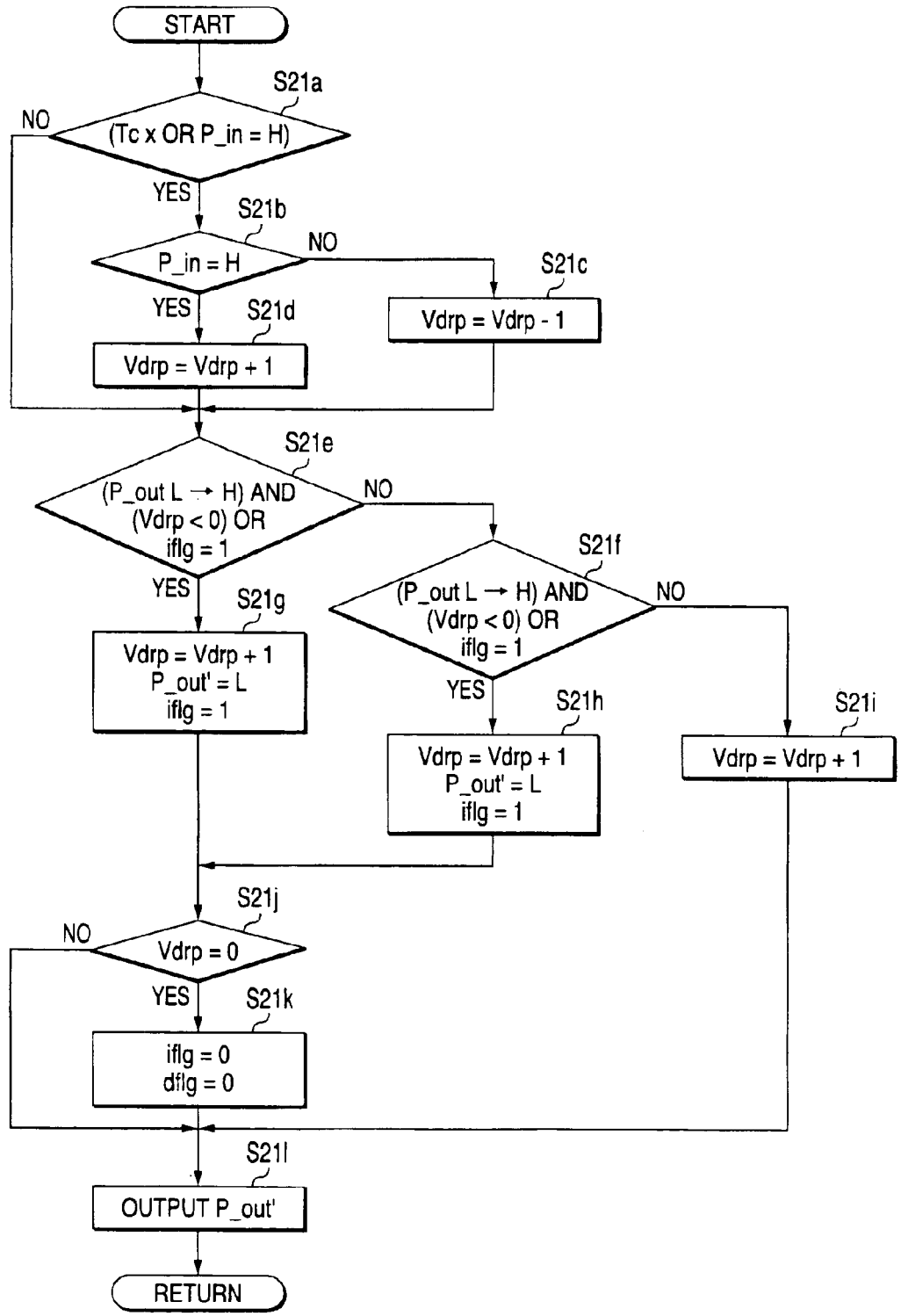
FIG. 9 is a flowchart showing operation of the power converter shown in FIG. 8.

Operation of the voltage error compensator 21 will now be described by reference to a flowchart shown in FIG. 9. In FIG. 9, operation steps of the voltage error compensator 21 are designated by reference numerals S21. Here, definitions of the reference symbols Tc, P_in, and P_out are the same as those shown in FIG. 3.

A determination is made as to whether or not multiple pulses have arisen (step S21a). A determination is made as to whether the multi-pulse prevention device 12 operates so as to increase or decrease an output (step S21b). Counting is performed in accordance with a value obtained as a result of determination of occurrence of multiple pulses, thereby producing an error count value Vdrp (steps S21c, 21d). When a change has arisen in the output P_out from the multi-pulse prevention device 12, a determination is made as to whether to reset the error count value Vdrp (steps S21e, S21f). If in step S21e the error count value obtained at the time of detection of a rising edge of the output P_out is negative, a corrected output P_out' is held at a low level, thereby adding to the count value (step S21g). In order to store the state of the edge, a flag iflg is activated. Similarly, if in step S21f the error count value obtained at the time of detection of a falling edge of the output P_out is positive, the corrected output P_out' is held at a high level, thereby adding to the count value. In order to store the state of the edge, a flag dflg is activated (step S21b). When the error count value has reached zero in step S21j, the flags iflg and dflg are cleared (step S21k).

In the power converter 1 of the present embodiment, the multi-pulse prevention device 12 can reliably prevent occurrence of multiple pulses in the PWM signal and compensate for a voltage error stemming from prevention of occurrence of multiple pulses, thereby acquiring a high-speed current response.

Fourth Embodiment

Figure 10:
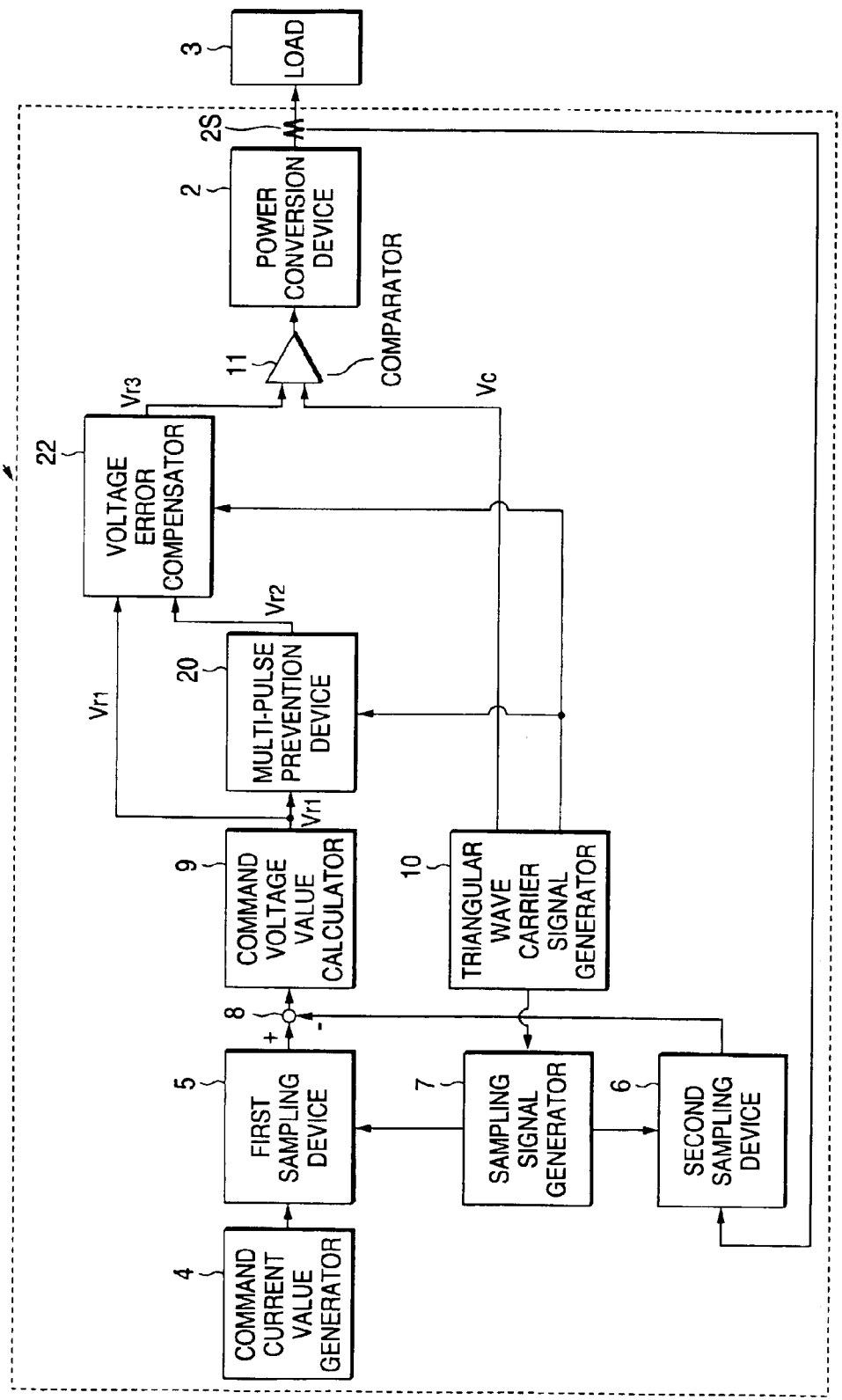
FIG. 10 is a block diagram of a power converter of yet another embodiment of the invention.

A fourth embodiment of the invention will now be described by reference to FIG. 10, which is a block diagram of a power converter. In FIG. 10, those reference numerals which are the same as those shown in FIG. 6 designate the same or corresponding elements, and their repeated explanations are omitted.

In the second embodiment, the intersection detection device detects occurrence of an intersection between the triangular wave carrier signal Vc and the first command voltage value Vr1. On the basis of a result of detection, the command voltage inhibition device produces the second command voltage value Vr2 which inhibits occurrence of a change in the first command voltage value Vr1 so as to prevent re-occurrence of intersection between the first command voltage value Vr1 and the triangular wave carrier signal Vc within the first cycle. The first PWM signal is produced by comparing the second command voltage value Vr2 with the triangular wave carrier signal Vc. The power converter 2 is activated by means of the first PWM signal.

However, the second command voltage value Vr2 activates the power conversion device 2 through use of a voltage command which has become displaced from the original voltage command (i.e., the first command voltage value Vr1) by only an amount corresponding to the extent to which occurrence of a change in the first command voltage value Vr1 is suppressed.

Here, in the embodiment, the power conversion device 2 is activated faithfully to the command voltage value Vr while occurrence of multiple pulses is inhibited.

As shown in FIG. 10, a second voltage error compensator 22 compensates for a voltage error by means of determining a voltage difference Δv between the first command voltage Vr1 which is to serve as an output from the command voltage value calculator 9 and the second command voltage value Vr2 which is to serve as an output from the second multi-pulse prevention device 20; summating errors arising in a voltage value changed by the multi-pulse prevention device 20, i.e., an error in a voltage output from the voltage converter 2; and adding the voltage value changed by the multi-pulse prevention device 20 to the command voltage value produced in the next half cycle or a subsequent half cycle of the triangular wave carrier signal Vc.

<Description of the Basic Operation of the Second Voltage Error Compensator>

Operation of the second voltage error compensator 22 provided in the power converter 1 having the foregoing configuration will now be described by reference to FIGS. 11A to 11E.

Figures 11, 11A, 11B, 11C, 11D, 11E:
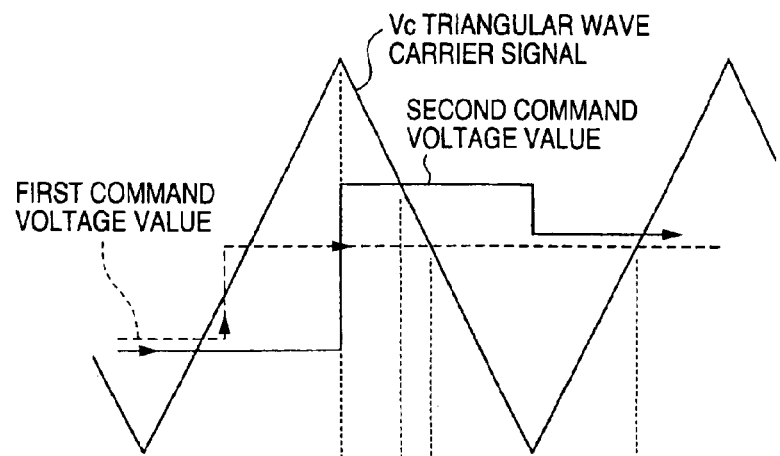
FIG. 11 is a timing chart showing triangular carriers arising in the power converter shown in FIG. 10 and a multi-pulse prevention device of the embodiment.

As shown in FIGS. 11A to 11E, when the first command voltage value Vr1 produced by the command voltage value calculator 9 (indicated by dashed lines) is input directly to the comparator 11, the comparator 11 compares the triangular wave carrier signal Vc with the first command voltage value Vr1, thereby producing the first PWM signal. As a result of the triangular wave carrier signal Vc and the first command voltage value vr1 crossing each other, multiple pulses; that is, the pulse Pa, arise in the first PWM signal (FIG. 11A). The multi-pulse prevention device 20 produces a first PWM signal which prevents occurrence of a change after first inversion (FIG. 11B). A difference between the first PWM signal and the second PWM signal becomes a pulse width (FIG. 11C). This pulse width is one which is obtained as a result of the first PWM signal having been changed to the second PWM signal by the multi-pulse prevention device 20. A sum of the pulse width corresponds to a total sum of errors (FIG. 11D). The total sum can be calculated from a difference between the first and second PWM signals. As in the case of a command issued after compensation indicated by a solid line in the drawing, the thus-calculated total sum of errors is added to the command voltage corresponding to a half cycle of the triangular wave carrier signal Vc. As shown in FIG. 1E, as a result, the pulse width can be increased by only an amount corresponding to the pulse width changed by the multi-pulse prevention device 20. These operations are performed by the second voltage error compensator 22. By means of comparison FIGS. 11A and 11E, the width of the next pulse is increased by only the extent to which the pulse width has been changed by the multi-pulse prevention device 20. A total pulse width; that is, an average voltage output from the power conversion device 2, is maintained.

<Description of the Operations by Reference to Flowchart>

Figure 12:
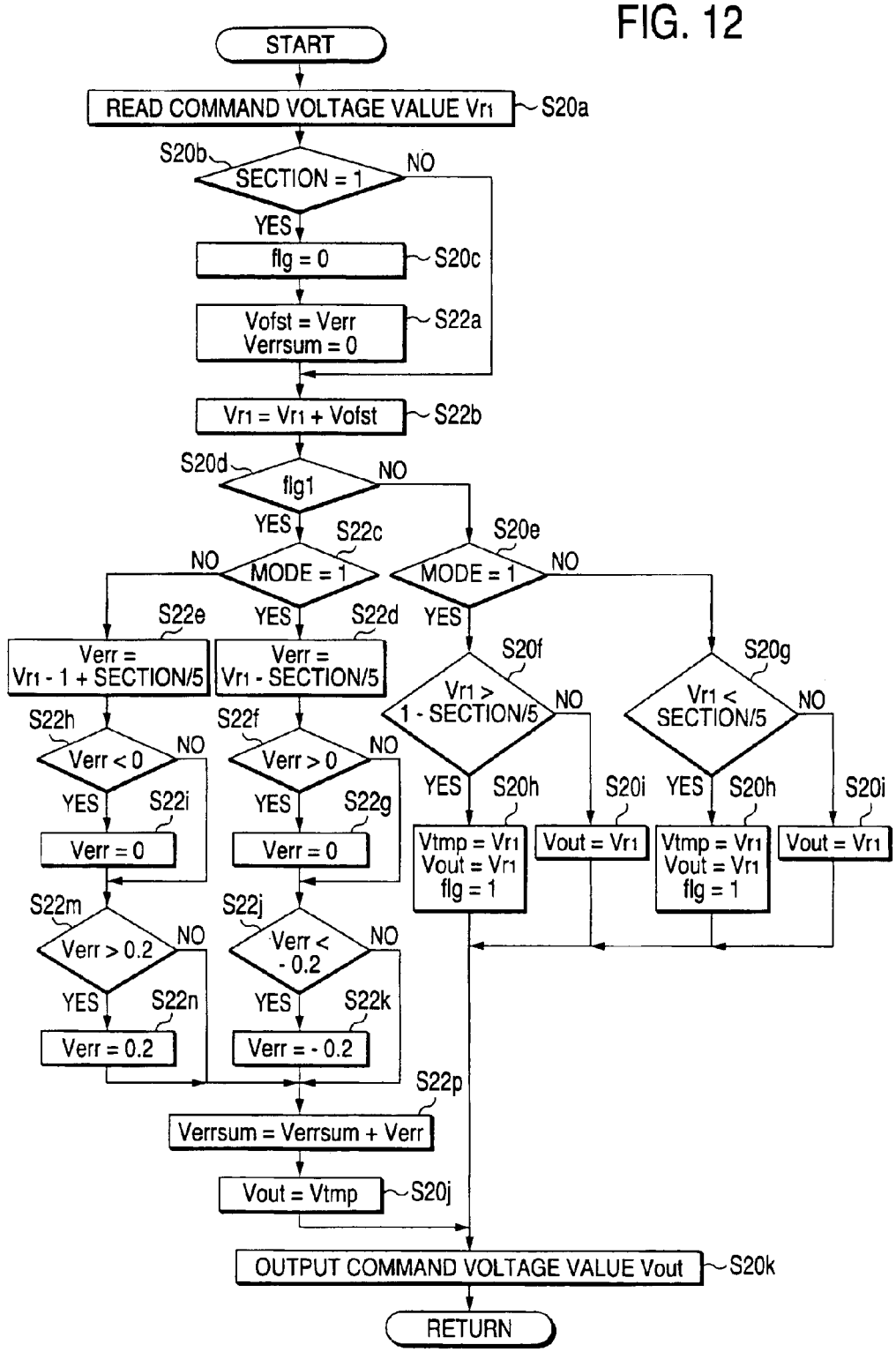
FIG. 12 is a flowchart showing operation of the power converter shown in FIG. 11.

Operation of the second voltage error compensator 22 and that of the second multi-pulse prevention device 20 will now be described by reference to a flowchart shown in FIG. 12. As shown in FIG. 12, steps pertaining to operations to be performed by the second voltage error compensator 22 are designated by reference numerals S22. Steps pertaining to operations to be performed by the second multi-pulse prevention device 20 are designated by reference numerals S20a to S20k. Those reference numerals which are the same as those shown in FIG. 8 designate the same or corresponding elements, and the definition of the mode and that of the section are the same as those provided in connection with FIG. 7.

The second voltage error compensator 22 reads the first command voltage value Vr1 (step S20a), thereby determining whether or not the triangular carrier wave signal Vc has shifted to a new half cycle (step S20b). When the triangular carrier wave signal Vc has shifted to a new half cycle, the flag fig storing occurrence of an intersection between the first command voltage Vr1 and the triangular wave carrier signal Vc is cleared (step S20c). A summated error Verrsum calculated during the preceding half cycle of the triangular carrier wave signal Vc is saved as Vofst, and the summated error Verrsum is reset to zero for summating errors arising during a current half cycle of the triangular wave carrier signal Vc (step S22a). The sum of errors Vofst calculated during the preceding half cycle of the triangular wave carrier signal Vc is added to the first command voltage value Vr1 (step S22b), and the flag flg is determined (S22d). When the first command voltage value Vr1 is determined not to have crossed the triangular wave carrier signal Vc before the preceding section, in step S20e and in subsequent steps a determination is made as to whether or not an intersection has arisen between the first command voltage value Vr1 and the triangular wave carrier signal Vc. A determination as to occurrence of an intersection between the first command voltage value Vr1 and the triangular carrier wave Vc is the same as that described in connection with FIG. 8, and hence repetition of its explanation is omitted. When a result of determination of the flat flg performed in step S20d shows that an intersection has arisen between the first command voltage value Vr1 and the triangular wave carrier signal Vc before the preceding section, a mode is determined (step S22c). This step is executed in view that an expression used for calculating the sum of errors in Mode 1 in which the triangular wave carrier signal Vc decreases differs from that used for calculating the sum of errors in Mode 2 in which the triangular wave carrier signal Vc increases. Further, an error voltage Verr corresponding to Mode 1 is calculated in step S22d, and an error voltage Verr corresponding to Mode 2 is calculated in step S22e. The error voltage Verr calculated in step S22d and the error voltage Verr calculated in S22e each include the maximum and minimum values. In steps S22f to S22n, the error voltage Verr is clamped by the maximum or minimum value. In step S22p the thus-calculated error voltage in each section is added to the summated error value Verrsum pertaining to a half cycle of the triangular wave carrier signal.

As mentioned above, in the power converter 1 of the embodiment, the second multi-pulse prevention device 20 more reliably prevents occurrence of multiple pulses in the PWM signal. Further, a voltage error stemming from prevention of occurrence of multiple pulses can be compensated for, thereby enabling attainment of a high-speed current response.

The above descriptions have described the embodiment in which the half cycle of the triangular wave carrier signal Vc is five times the cycle of the sampling signal. However, the same advantage can also be yielded even when the half cycle of the triangular wave carrier signal Vc is an arbitrary multiple of the cycle of the sampling signal.

Fifth Embodiment

Figure 13:
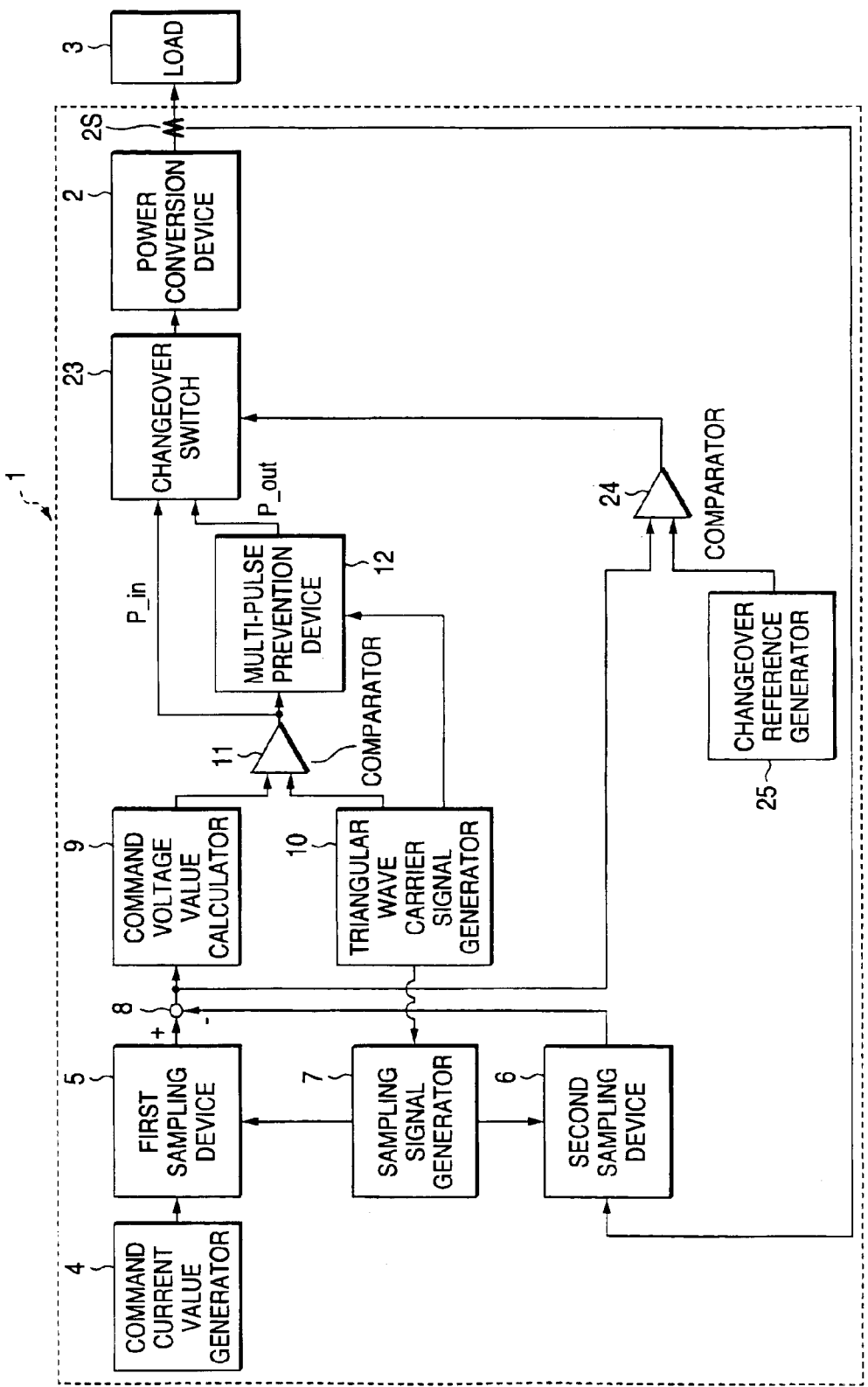
FIG. 13 is a block diagram of a power converter of still another embodiment of the invention.

A fifth embodiment of the invention will now be described by reference to FIG. 13, which is a block diagram of a power converter. In FIG. 13, those reference numerals which are the same as those shown in FIG. 1 designate the same or corresponding elements, and their repeated explanations are omitted.

The power converter 1 of FIG. 13 comprises a changeover switch 23 serving as current comparison device which selects one from the first PWM signal which is to be output from the comparator 11 and the second PWM signal which is to be output from the multi-pulse prevention device 12; a second comparator 24 for outputting a first changeover command signal to the changeover switch 23; and a changeover reference generator 25 for producing a reference current value $\Delta ir$ pertaining to a difference $\Delta i$ between a second command current to be used for switching the changeover switch 23 and a second detected current value.

Figure 14:
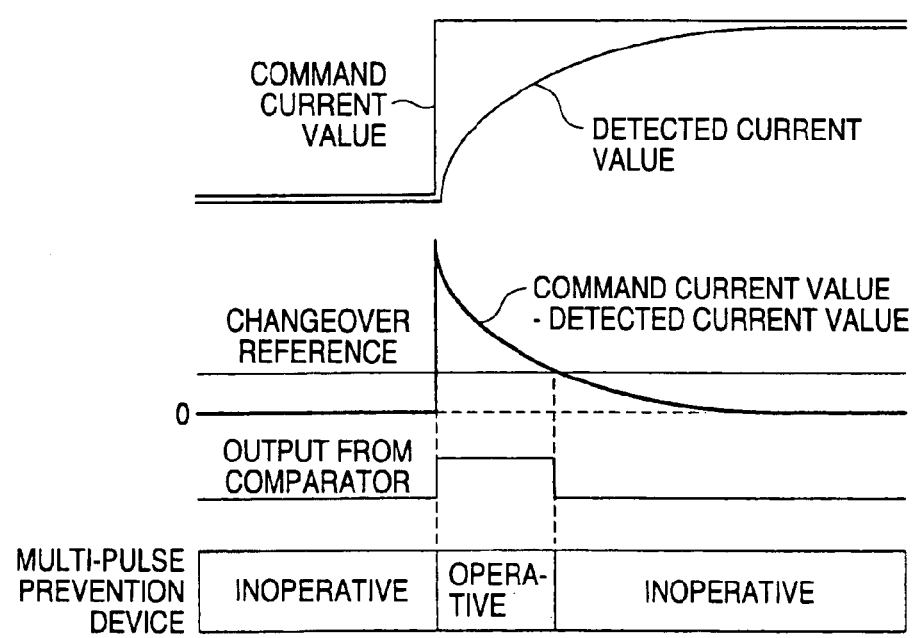
FIG. 14 is a timing chart showing operation of the power converter shown in FIG. 13.

As shown in FIG. 14, in the power converter 1, when an abrupt change has arisen in the second (or first) command current value, the second (first) detected current value follows the second (first) command current value with a lag. At this time, the difference $\Delta i$ between the second command current value and the second detected current value increases. The command voltage value calculator 9 produces a large command current value, thereby causing a detected current value to quickly approach the command current value.

However, in the event of occurrence of multiple pulses in the first PWM signal, the second multi-pulse prevention device 12 produces the second PWM signal, thereby preventing occurrence of multiple pulses. Consequently, the power conversion device 2 does not operate in compliance with the command voltage value output from the command voltage value calculator 9, thus leading to occurrence of a delay in the detected current value following the command current value.

For this reason, when the difference $\Delta i$ between the second command current value and the second detected current value exceeds the reference current value $\Delta ir$, the second comparator 24 issues a switching signal, thereby switching the second PWM signal to the first PWM signal. Specifically, the output from the comparator 11 is switched to the output from the multi-pulse prevention device 12, and the thus-switched output is input to the power conversion device 2, thereby improving a response to the command current value. In general, a period of time during which the difference $\Delta i$ remains large is limited. Hence, an increase in the loss of the power conversion device 2 falls within tolerance limits.

As mentioned above, in the power converter 1 of the embodiment, the changeover switch 23 can select between the first PWM signal and the second PWM signal. Hence, when the loss of the power conversion device 2 does not present any problem, there is yielded an advantage of the ability to acquire a much faster response without use of the multi-pulse prevention device 12.

Alternatively, the changeover switch 23 may select one from the first PWM signal and the second PWM signal by combination of the present embodiment and the third embodiment (FIG. 7).

Sixth Embodiment

Figure 15:
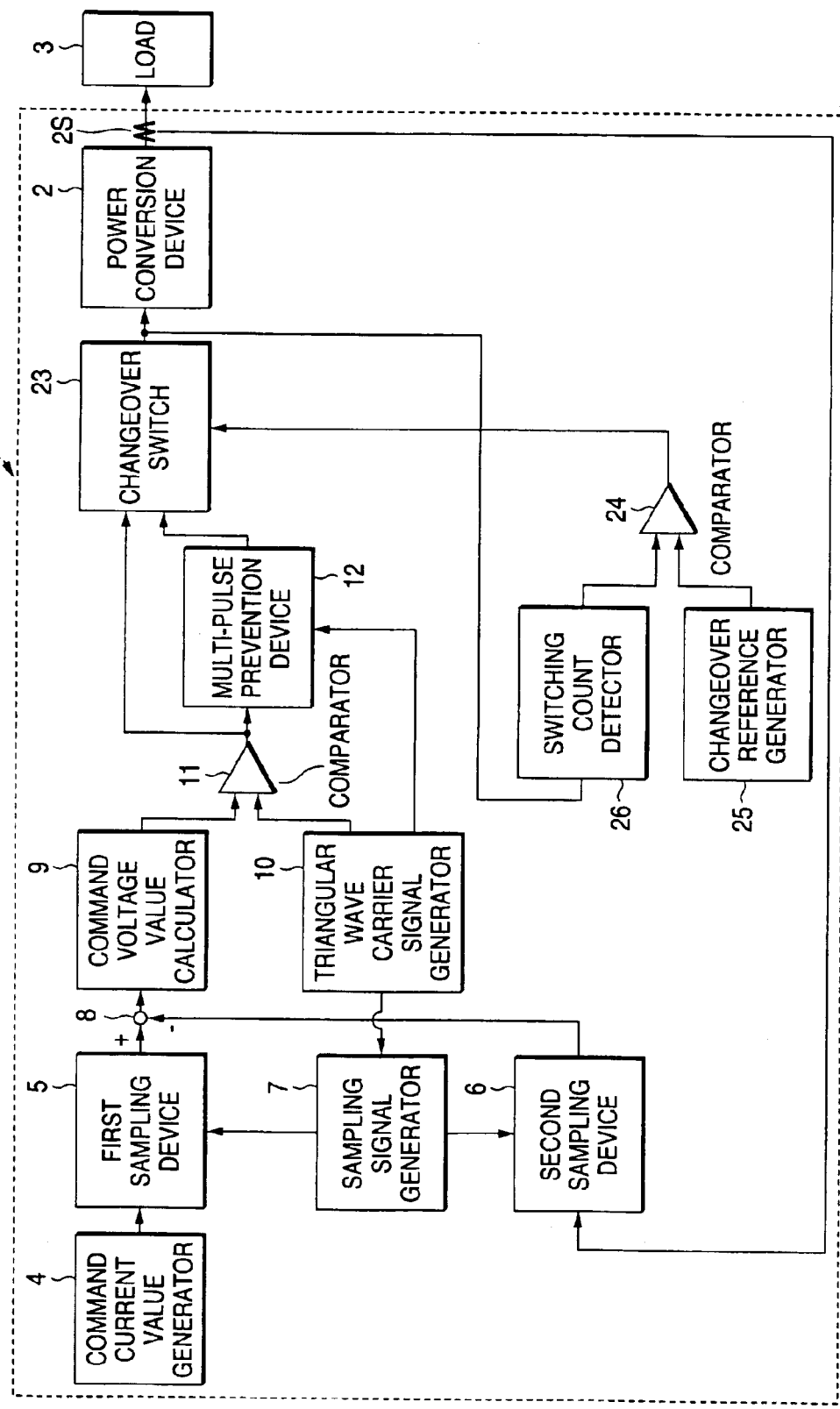
FIG. 15 is a block diagram of a power converter of still another embodiment of the invention.

A sixth embodiment of the invention will now be described by reference to FIG. 15, which is a block diagram of a power converter. In FIG. 15, those reference numerals which are the same as those shown in FIG. 13 designate the same or corresponding elements, and their repeated explanations are omitted.

The power converter 1 comprises the changeover switch 23, which selects one from the first PWM signal which is to be output from the comparator 11 and the second PWM signal which is to be output from the multi-pulse prevention device 12; the second comparator 24 serving as count comparison device for outputting a changeover command signal to the changeover switch 23; the changeover reference generator 25 for producing a reference count value pertaining to the number of switching operations of the power switching element in consideration of the temperature of the power conversion device 2; and a switching count detector 26 which counts the number of switching operations performed by the power switching element of the power conversion device 2, e.g. the number of rises or falls of a pulse input to the power conversion device 2, within a given period of time, thereby outputting a detected count value.

Operation of the power converter 1 having such a configuration will now be described. The second comparator 24 compares the reference count value produced by the changeover reference generator 25 with the detected count value output from the switching count detector 26. When the detected count value exceeds the reference count value, the second comparator 24 produces a first changeover command signal, to thereby cause the changeover switch 23 to switch the first PWM signal to the second PWM signal. Hence, the number of switching operations to be performed by the power switching element is reduced, thereby inhibiting an increase in the temperature of the power conversion device 2.

When the detected count value is lower than the reference count value, a margin is provided for the temperature of the power conversion device 2. Therefore, the second comparator 24 issues a second changeover command signal, to thereby cause the changeover switch 23 to switch the second PWM signal to the first PWM signal. Thus, a high-speed response is implemented.

Figure 16:
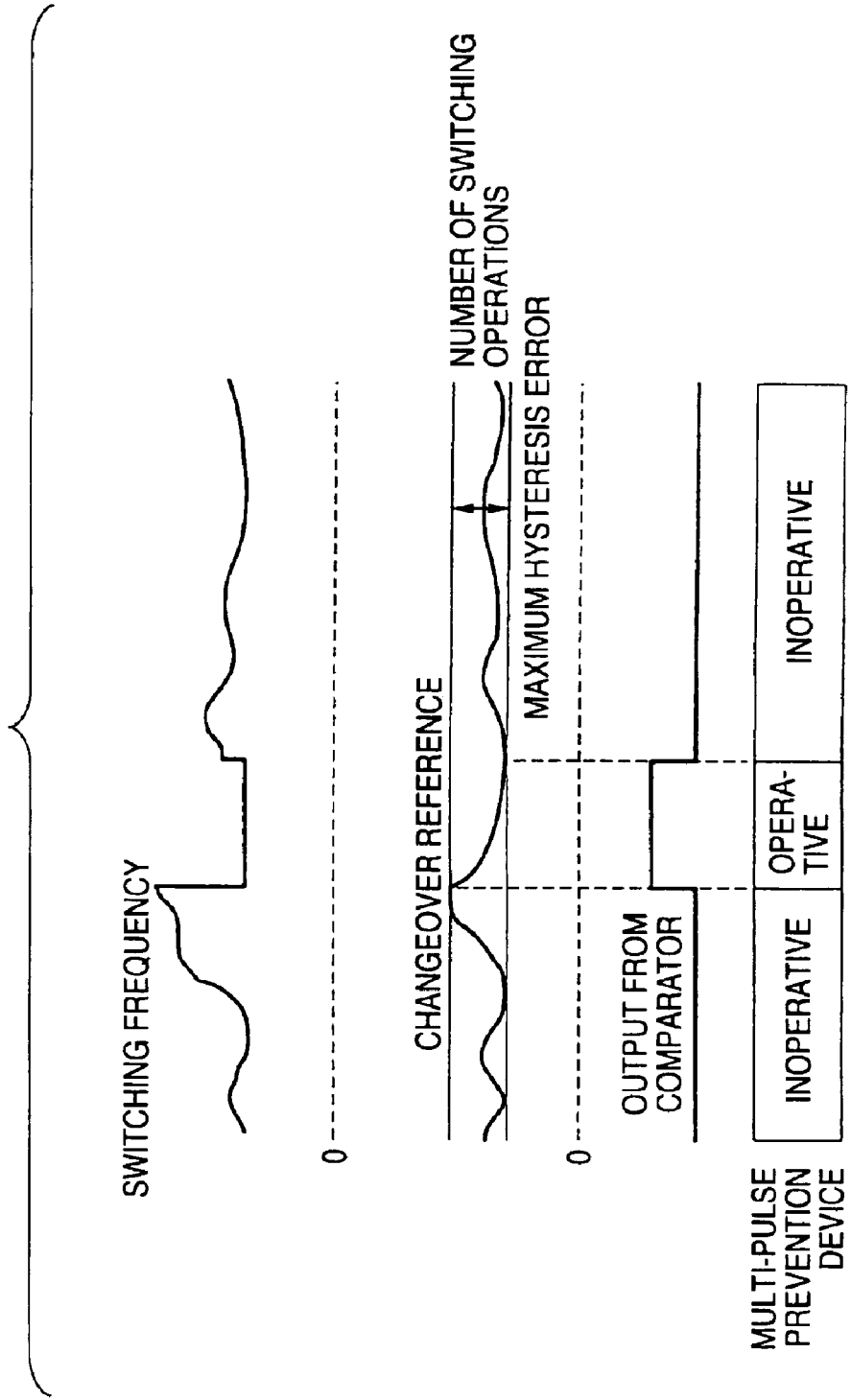
FIG. 16 is a timing chart showing operation of the power converter shown in FIG. 15.

In this case, use of a hysteresis comparator as the second comparator 24 in the manner illustrated in FIG. 16 is preferable, because the width of a change in the number of switching operations can be controlled by means of a maximum hysteresis error.

As mentioned above, in the power converter 1 of the embodiment, the first changeover switch 23 can select either the first PWM signal or the second PWM signal. If the loss of the power conversion device 2 presents no problem, the first PWM signal is input to the power conversion device 2, thereby yielding an advantage of the ability to achieve a higher-speed response.

The present embodiment may be combined with the third embodiment (see FIG. 7), thereby causing the changeover switch 23 to select either the first PWM signal or the second PWM signal.

Seventh Embodiment

Figure 17:
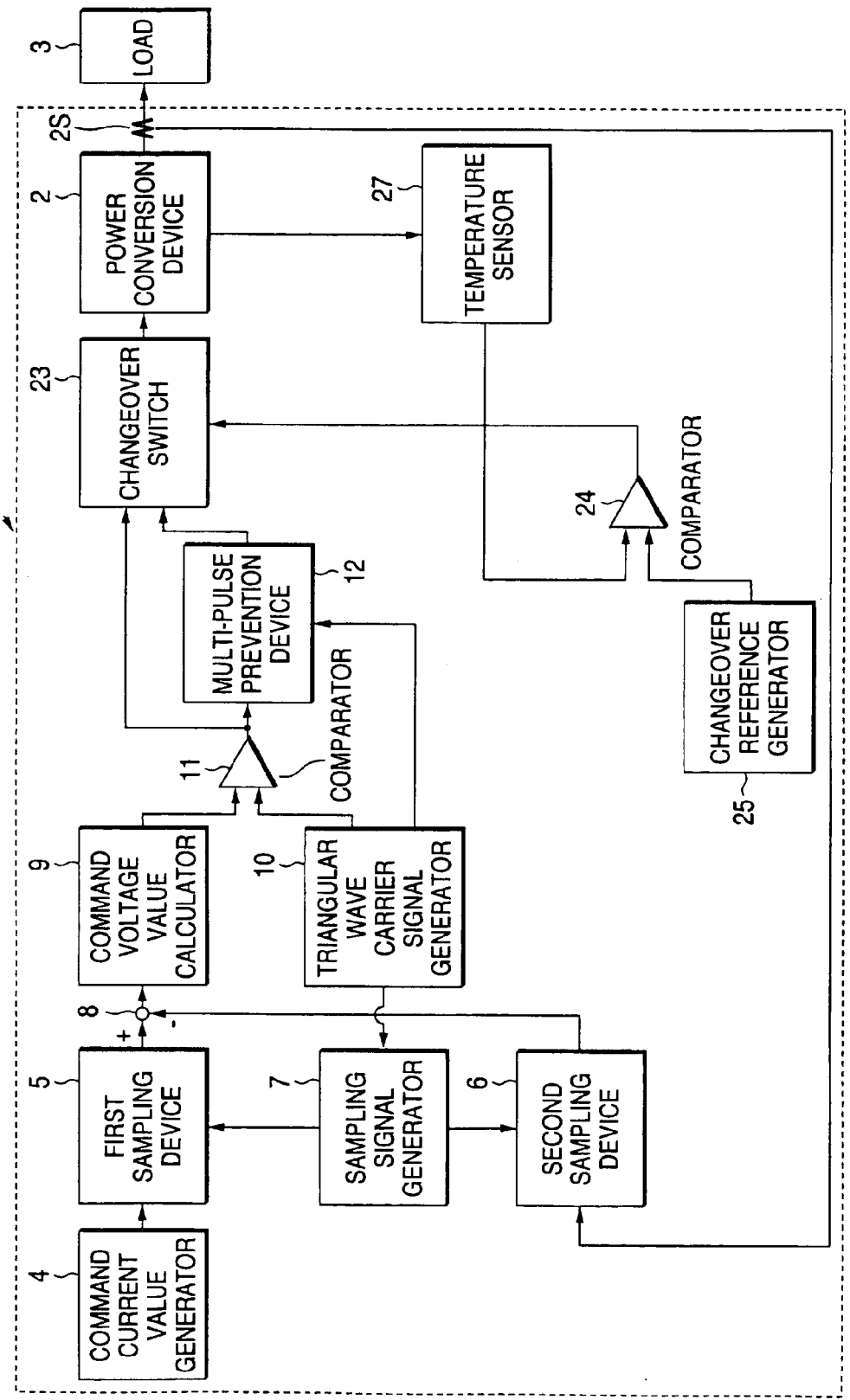
FIG. 17 is a block diagram of a power converter of still another embodiment of the invention.

A seventh embodiment of the invention will now be described by reference to FIG. 17, which is a block diagram of a power converter. In FIG. 17, those reference numerals which are the same as those shown in FIG. 1 designate the same or corresponding elements, and their repeated explanations are omitted.

The power converter 1 in FIG. 17 comprises the first changeover switch 23, which selects one from the first PWM signal which is to be output from the comparator 11 and the second PWM signal which is to be output from the multi-pulse prevention device 12; the second comparator 24 serving as temperature comparison device for outputting a changeover command signal to the changeover switch 23; the changeover reference generator 25 for producing a reference temperature of the power conversion device 2 to be used for causing the changeover switch 23 to perform switching operation; and a temperature sensor 27 for detecting the temperature of the power conversion device 2.

Figure 18:
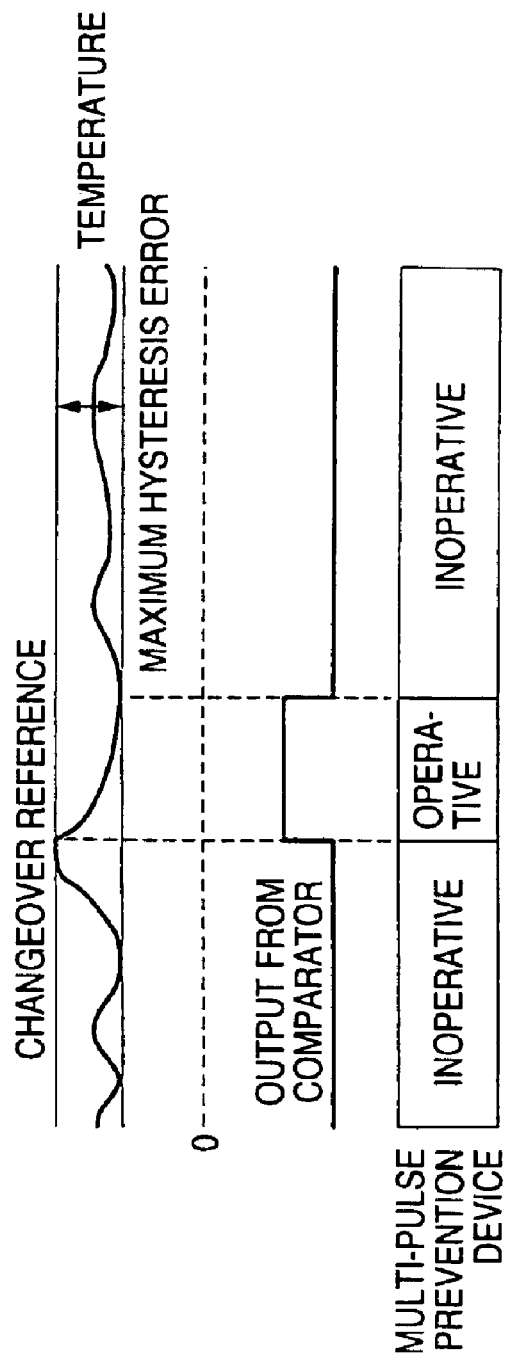
FIG. 18 is a timing chart showing operation of the power converter shown in FIG. 17.
Figure 19:
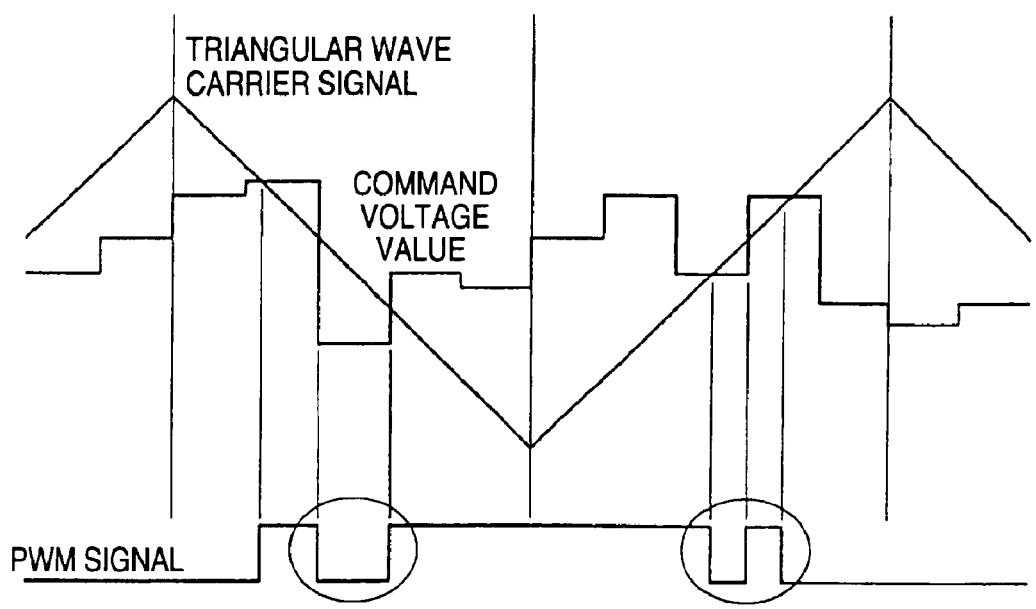
FIG. 19 is a view for describing operation of a related-art power converter.

In the power converter 1, the temperature of the power conversion device 2 usually varies in accordance with an operating frequency of the load 3 and occurrence/non-occurrence of multiple pulses. For instance, as shown in FIG. 18, the temperature of the power conversion device 2 varies with lapse of time. Here, the second comparator 24 compares a reference temperature produced by the changeover reference generator 25 with the temperature of the power conversion device 2 detected by the temperature sensor 27. When the detected temperature exceeds the reference temperature, the changeover switch 23 selects an output from the multi-pulse prevention device 12, thereby driving the power conversion device 2 through use of the second PWM signal and thus inhibiting occurrence of an increase in the temperature of the power conversion device 2.

However, when the detected temperature is lower than the reference temperature, a margin is provided for the temperature of the power conversion device 2. Hence, the changeover switch 23 selects an output from the comparator 11, thereby realizing a high-speed response. At that time, if a hysteresis comparator is used as the second comparator 24, the width of a change in the temperature of the power conversion device 2 can be controlled by means of a maximum hysteresis error.

As mentioned above, in the power converter 1 of the embodiment, the changeover switch 23 can select either the first PWM signal or the second PWM signal on the basis of a result of comparison between the detected temperature of the power conversion device 2 and the reference temperature. Accordingly, if the loss of the power conversion device 2 presents no problem, the multi-pulse prevention device 12 is not employed, thereby yielding an advantage of the ability to achieve a higher-speed response.

The present embodiment may be combined with the third embodiment (see FIG. 7), thereby causing the changeover switch 23 to select either the first PWM signal or the second PWM signal.

Eighth Embodiment

The techniques described in connection with the fifth through seventh embodiments can also be combined with the second or fourth embodiment. Specifically, in the fifth to seventh embodiments the changeover switch 23 effects switching between the first PWM signal and the second PWM signal. However, the same advantage can also be yielded by the second embodiment (FIG. 4) or the fourth embodiment (FIG. 10) even when the change over switch 23 effects switching between the first command voltage value Vr1 output from the command voltage calculator 9 and the second command voltage value Vr2 output from the multi-pulse prevention device 20.

INDUSTRIAL APPLICABILITY

As mentioned above, the power converter of the invention is suitable for use with an inverter.

What is claimed is:

1. A power converter comprising:

triangular wave carrier signal generation device for generating a triangular wave carrier signal during a first cycle;

first sampling device for sampling a first command current value for a power conversion device during a second cycle which is set so as to become shorter than one-half the first cycle and for generating a second command current value;

second sampling device for sampling, during the second cycle, a first detected current value for a load to be driven by the power conversion device and producing a second detected current value;

command voltage value calculation device for calculating a command voltage value on the basis of the second command current value and the second detected current value;

comparison device for producing a first pulse width modulation (PWM) signal by comparing a first command voltage value with the triangular wave carrier signal;

inversion detection device for detecting inversion of the first PWM signal; and inversion inhibition device for driving the power conversion device by means of one of a second PWM signal which prevents inversion of the first PWM signal during the first cycle and a third PWM signal, on the basis of a result of detection of the inversion detection device.

2. A power converter comprising:

triangular wave carrier signal generation device for generating a triangular wave carrier signal during a first cycle;

first sampling device for sampling a first command current value for a power conversion device during a second cycle which is set so as to become shorter than one-half the first cycle and for generating a second command current value;

intersection detection device for sampling a first detected current of a load to be driven by the power conversion device during the second cycle and detecting occurrence of an intersection between a first command voltage value and the triangular wave carrier signal;

command voltage value suppression device for producing a second command voltage value which prevents occurrence of a change in the first command voltage value, so as to prevent re-occurrence of an intersection between the first command voltage value and the triangular wave carrier signal within the first cycle, on the basis of a result of detection performed by the intersection detection device; and comparison device for comparing one of the second command voltage value and a third command voltage value with the triangular wave carrier signal, thereby producing a PWM signal and driving the power conversion device through use of the PWM signal.

3. The power converter according to claim 1, further comprising:

error compensation device which determines a difference between a pulse width of the first PWM signal and that of the second PWM signal, produces the third PWM signal by means of adding the difference to the pulse width of the second PWM signal which is to be produced in the next half cycle or a subsequent half cycle of the triangular wave carrier signal, and drives the power conversion device by means of the third PWM signal.

4. The power converter according to claim 2, further comprising:

command voltage difference calculation device for determining a difference command voltage value which represents a difference between the first command voltage value and the second command voltage value during a first half cycle of the triangular wave carrier signal;

command voltage correction device for adding a third command voltage value, to which is added the difference command voltage value, to the second command voltage value produced during the first half cycle or a subsequent half cycle; and comparison device which compares the third command voltage value in lieu of the second command voltage value with the triangular wave carrier signal, to thereby produce the PWM signal, and which drives the power conversion device through use of the PWM signal.

5. The power converter according to claim 1, further comprising:

first changeover device which switches the second or third PWM signal to the first PWM signal by means of a changeover command signal to drive the power conversion device.

6. The power converter according to claim 2, further comprising:

second changeover device which switches the second or third command voltage value to the first command voltage value by means of a changeover command signal.

7. The power converter according to claim 5, further comprising:

current comparison device which compares a difference between the second command current value and the second detected current value with a predetermined reference current value and which produces the changeover command signal when the difference exceeds the reference current value.

8. The power converter according to claim 5, further comprising:

count detection device which counts the number of switching operations of the power conversion device within a predetermined period of time and outputs a detected count value; and count comparison device which compares a predetermined reference count value with the detected count value and produces the changeover command signal when the detected count value is lower than the reference count value.

9. The power converter according to claim 5, further comprising:

temperature detecting device for detecting a temperature of the power conversion device; and temperature comparison device which compares a predetermined reference temperature with the detected temperature and produces the changeover command signal when the detected temperature is lower than the temperature.

10. The power converter according to claim 6, further comprising:

current comparison device which compares a difference between the second command current value and the second detected reference current value with a predetermined reference current value and which produces the changeover command signal when the difference exceeds the reference current value.

11. The power converter according to claim 6, further comprising:

count detection device which counts the number of switching operations of the power conversion device within a predetermined period of time and outputs a detected count value; and count comparison device which compares a predetermined reference count value with the detected count value and produces the changeover command signal when the detected count value is lower than the reference count value.

12. The power, converter according to claim 6, further comprising:

temperature detecting device for detecting a temperature of the power conversion device; and temperature comparison device which compares a predetermined reference temperature with the detected temperature and produces the changeover command signal when the detected temperature is lower than the reference temperature.

* * * * *